(12) United States Patent
MacKinnon et al.

(10) Patent No.: US 7,897,693 B2
(45) Date of Patent: *Mar. 1, 2011

(54) PROTON CONDUCTIVE POLYMER ELECTROLYTES AND FUEL CELLS

(75) Inventors: Sean M MacKinnon, West Henrietta, NY (US); Timothy J. Fuller, Pittsford, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 310 days.

This patent is subject to a terminal disclaimer.

(21) Appl. No.: 12/197,704

(22) Filed: Aug. 25, 2008

(65) Prior Publication Data

US 2009/0281262 A1 Nov. 12, 2009

Related U.S. Application Data

(60) Provisional application No. 61/052,138, filed on May 9, 2008.

(51) Int. Cl.
C08F 214/14 (2006.01)
(52) U.S. Cl. .................. 525/326.2; 526/250; 526/252; 526/253; 526/254
(58) Field of Classification Search ............. 525/326.2; 526/250, 252, 253, 254
See application file for complete search history.

(56) References Cited

U.S. PATENT DOCUMENTS

| | | | |
|---|---|---|---|
| 5,021,602 A | 6/1991 | Clement et al. | |
| 5,037,917 A | 8/1991 | Babb et al. | |
| 5,066,746 A | 11/1991 | Clement et al. | |
| 5,159,037 A | 10/1992 | Clement et al. | |
| 5,159,038 A | 10/1992 | Babb et al. | |
| 5,316,871 A | 5/1994 | Swathirajan et al. | |
| 5,910,378 A | 6/1999 | Debe et al. | |
| 6,124,060 A | 9/2000 | Akita et al. | |
| 6,183,668 B1 | 2/2001 | Debe et al. | |
| 6,277,512 B1 | 8/2001 | Hamrock et al. | |
| 6,384,167 B2 | 5/2002 | DesMarteau et al. | |
| 6,444,343 B1 | 9/2002 | Prakash et al. | |
| 6,521,381 B1 | 2/2003 | Vyas et al. | |
| 6,523,699 B1 | 2/2003 | Akita et al. | |
| 6,559,237 B1 | 5/2003 | Mao et al. | |
| 6,670,065 B2 | 12/2003 | Koyama et al. | |
| 6,847,518 B2 | 1/2005 | Fukuda et al. | |
| 6,875,537 B2 | 4/2005 | Tani et al. | |
| 6,926,984 B2 | 8/2005 | Asano et al. | |
| 6,933,068 B2 | 8/2005 | Asano et al. | |
| 6,953,653 B2 * | 10/2005 | Smith et al. ................. | 430/321 |
| 6,986,962 B2 | 1/2006 | Oyanagi et al. | |
| 7,001,929 B2 | 2/2006 | Goto et al. | |
| 7,045,241 B2 | 5/2006 | Akita et al. | |
| 7,094,851 B2 | 8/2006 | Wu et al. | |
| 2001/0018144 A1 | 8/2001 | Watakabe et al. | |
| 2002/0014405 A1 | 2/2002 | Arcella et al. | |
| 2003/0017379 A1 | 1/2003 | Menashi | |
| 2003/0096149 A1 | 5/2003 | Koyama et al. | |
| 2003/0180596 A1 | 9/2003 | Yoshimura et al. | |
| 2004/0214058 A1 | 10/2004 | Tada et al. | |
| 2004/0214065 A1 | 10/2004 | Kanaoka et al. | |
| 2005/0014927 A1 | 1/2005 | Akita | |
| 2005/0043487 A1 | 2/2005 | Felix et al. | |
| 2005/0048342 A1 | 3/2005 | Wakahoi et al. | |
| 2005/0053810 A1 | 3/2005 | Kato et al. | |
| 2005/0058864 A1 | 3/2005 | Goebel | |
| 2005/0064260 A1 | 3/2005 | Otsuki et al. | |
| 2005/0100770 A1 | 5/2005 | Sugawara et al. | |
| 2005/0106440 A1 | 5/2005 | Komiya | |
| 2005/0116206 A1 | 6/2005 | Kakuta et al. | |
| 2005/0130024 A1 | 6/2005 | Otsuki et al. | |
| 2005/0142397 A1 | 6/2005 | Wakahoi et al. | |
| 2005/0143530 A1 | 6/2005 | Iwadate et al. | |
| 2005/0175886 A1 | 8/2005 | Fukuda et al. | |
| 2005/0197467 A1 | 9/2005 | Komiya et al. | |
| 2005/0227138 A1 | 10/2005 | Fukuda et al. | |
| 2005/0233181 A1 | 10/2005 | Wariishi et al. | |
| 2005/0260474 A1 | 11/2005 | Asano et al. | |
| 2006/0019147 A1 | 1/2006 | Fukuda et al. | |
| 2006/0127728 A1 | 6/2006 | Otsuki et al. | |
| 2006/0177719 A1 | 8/2006 | Fuller et al. | |
| 2007/0042242 A1 | 2/2007 | Tada et al. | |
| 2007/0099054 A1 | 5/2007 | Fuller et al. | |
| 2007/0141237 A1 | 6/2007 | Okiyama et al. | |
| 2009/0278083 A1 | 11/2009 | Fuller et al. | |

FOREIGN PATENT DOCUMENTS

JP 2003535929 T 12/2003

(Continued)

OTHER PUBLICATIONS

Budy, S.M. et al., "Facile preparation of fluorovinylene aryl ether telechelic polymers with dual functionality for thermal chain extension and tandem crossliking," Chem. Commun. 2006, pp. 4844-4846, 2006.

(Continued)

Primary Examiner—Bernard Lipman
(74) Attorney, Agent, or Firm—Brooks Kushman P.C.

(57) ABSTRACT

In one embodiment, a copolymer comprises a sulfonatable segment covalently linked to an un-sulfonatable segment through an organic linking group. The sulfonatable group segment may be sulfonated through direction sulfonation or sulfonation through a spacer molecule. In another embodiment, a copolymer comprises a sulfonated segment and an unsulfonated segment. A membrane electrode assembly and a fuel cell may be produced using the copolymer.

12 Claims, 18 Drawing Sheets

FOREIGN PATENT DOCUMENTS

| | | | |
|---|---|---|---|
| JP | 2005129298 A | | 5/2005 |
| JP | 2005166557 A | | 6/2005 |
| JP | 2005179380 A | | 7/2005 |
| JP | 2009249487 | * | 4/2008 |
| JP | 2009249487 A | | 10/2009 |
| WO | 2004/051776 | | 6/2004 |
| WO | 2007/052954 A1 | | 5/2007 |

OTHER PUBLICATIONS

Li, Z. et al., A Novel Bisphenol Monomer with Grafting Capability and the Resulting Poly(arylene ether sulfone)s, Macromolecules 2006, 39, pp. 6990-6996.

Matsumura, S. et al., Ionomers for Proton Exchange Membrane Fuel Cells with Sulfonic Acid Groups on the End Groups: Novel Branched Poly(eteher-ketone)s, Macromolecules 2008, 41, pp. 281-284.

Smith, D.W. et al., "Perfluorocyclobutane Aromatic Polyethers. Synthesis and Characterization of New Siloxane-Containing Fluoropolymers," Macromolecules 1996, v. 29, pp. 852-860.

Smith, D.W. et al., "Perfluorocyclobutane (PFCB) polyaryl ethers: versatile coatings material," J. of Fluorine Chem., v. 104, pp. 109-117 (2000).

Souzy, R. et al., "Functional fluoropolymers for fuel cell membranes," Solid State Ionics, v. 176, pp. 2839-2848 (2005).

Souzy, R. et al., "Functional fluoropolymers for fuel cell membranes," Prog. Polm. Sci. 30, 2005, pp. 644-687.

Ford, L.A. et al., "New Aromatic Perfluorovinyl Ether Monomers Containing the Sulfonimide Acid Functionality," Polymeric Materials Science & Eng., v. 83, 2000, pp. 10-11 (American Chemical Society).

Souzy, R. et al., "Synthesis and (co)polymerization of monofluoro, difluoro, trifluorostyrene and ((trifluorovinyl)oxy) benzene," Prog. Polm. Sci. 29 (2004), pp. 75-106.

* cited by examiner

| $Z_1(Z_2)$ | $Z_2(Z_1)$ | $L_1$ | Remarks |
|---|---|---|---|
| —C(=O)Cl | HO— | —C(=O)—O— | |
| —NCO | HO— | —NH—C(=O)—O— | |
| —OH | $X_5$—C$_6$H$_4$—Z—C$_6$H$_4$— | —O—C$_6$H$_4$—Z—C$_6$H$_4$— | $X_5$ is F, Cl; Z is CO, SO, SO$_2$ |
| —OH | $F_2C=CF-O-$ | —O—CF=CF—O— | |
| —OH | $F_2C=CF-O-$ | —O—CF$_2$-CHF—O— | |
| —NH$_2$ | phthalic anhydride | phthalimide | |
| —NH$_2$ | Cl—C(=O)— | —NH—C(=O)— | |
| —NH$_2$ | OCN— | —NH—C(=O)—NH— | |

Figure 2C

| $Z_1(Z_2)$ | $Z_2(Z_1)$ | $L_1$ | Remarks |
|---|---|---|---|
| —CH₂OH | Br— | —CH₂O— | |
| —CH₂OH | H₂C—CH— (epoxide) | —CH₂O—CH₂—CH(OH)— | |
| —CH₂OH | OCN— | —CH₂O—C(=O)—NH— | |
| —Br | Br—C₆H₄— | —C₆H₄— | |
| —Cl | B(OH)₂—C₆H₄— | —C₆H₄— | |
| —B(OH)₂ | X₆—C₆H₄— | —C₆H₄— | $X_6$ is Br, Cl |
| —CH=CH₂ | —CH=CH₂ | | free radical polymerization |
| —CF=CF₂ | —CF=CF₂ | | cationic polymerization |
| —≡— | —≡— | | anionic polymerization |

Figure 2D

| $X_2$ | $Y_1R_6Y_1$ | $L_3$ | |
|---|---|---|---|
| ClC(=O)– | HO–$R_6$–OH | –C(=O)–O–$R_6$–O–C(=O)– | $R_6$ is aryl, alkyl |
| ClC(=O)– | $NH_2$–$R_6$–$NH_2$ | –C(=O)–NH–$R_6$–NH–C(=O)– | $R_6$ is aryl, alkyl |
| –NCO | HO–$R_6$–OH | –NH–C(=O)–O–$R_6$–O–C(=O)–NH– | $R_6$ is aryl, alkyl |
| –OH | $X_3$–(C$_6$H$_4$–$Z_3$–C$_6$H$_4$)$_2$–$R_6$ | –O–C$_6$H$_4$–$Z_3$–C$_6$H$_4$–$R_6$–C$_6$H$_4$–$Z_3$–C$_6$H$_4$–O– | $X_3$ is Cl, F; $R_6$ is aryl, alkyl; $Z_3$ is C(=O), S(=O), S(=O)$_2$ |
| –OH | $F_2C=CF$–O–$R_6$–O–$CF=CF_2$ | O–CF$_2$–C(F)(O)–$R_6$–O–C(F)(O)–CF$_2$–O ? | $R_6$ is aryl, alkyl |
| –OH | $F_2C=CF$–O–$R_6$–O–$CF=CF_2$ | O–CF$_2$CHFO–$R_6$–O–CHFCF$_2$O | $R_6$ is aryl, alkyl |
| –$NH_2$ | (anhydride)–$R_6$–(anhydride) | (imide)–$R_6$–(imide) | $R_6$ is aryl, alkyl |
| –$NH_2$ | ClC(=O)–$R_6$–C(=O)Cl | –NH–C(=O)–$R_6$–C(=O)–NH– | $R_6$ is aryl, alkyl |

Figure 8B

| $X_2$ | $Y_1R_6Y_1$ | $L_3$ | |
|---|---|---|---|
| —NH$_2$ | OCN—R$_6$—NCO |  | R$_6$ is aryl, alkyl |
| —CH$_2$—OH | Br—R$_6$—Br |  | R$_6$ is aryl, alkyl |
| —CH$_2$—OH |  (epoxide-R$_6$-epoxide) |  | R$_6$ is aryl, alkyl |
| —CH$_2$—OH | OCN—R$_6$—NCO |  | R$_6$ is aryl, alkyl |
| -Br | Br—⌬—R$_{10}$—⌬—Br (or Cl-) |  | R$_6$ is aryl, alkyl |
| -Cl | B(OH)$_2$—⌬—R$_6$—⌬—B(OH)$_2$ |  | R$_6$ is aryl, alkyl |
| —B(OH)$_2$ | X$_9$—⌬—R$_6$—⌬—X$_9$ |  | R$_6$ is aryl, alkyl<br>X$_9$ is Br, I |

PROTON CONDUCTIVE POLYMER ELECTROLYTES AND FUEL CELLS

CROSS-REFERENCE TO RELATED APPLICATIONS

This application claims the benefit of U.S. provisional application Ser. No. 66/1052,138 filed May 9, 2008.

TECHNICAL FIELD

The field to which the disclosure generally relates includes polymer electrolyte and fuel cells.

BACKGROUND

Polymer electrolytes play an important part in electrochemical devices such as batteries and fuel cells. To achieve optimal performance, the polymer electrolyte must maintain a high ionic conductivity and mechanical stability at both high and low relative humidity. The polymer electrolyte also needs to have excellent chemical stability for long product life and robustness. Fluorinated random copolymers have been explored as electrolytes for fuel cells. Due to their inherent random chain configuration, however, random copolymers typically suffer from water swelling at high humidity and excess membrane shrinkage at low humidity. A random copolymer membrane lacks the mechanical robustness to withstand the rigors of hydration and dehydration within an operating fuel cell. Thus, there is a need for an improved polymer electrolyte that maintains robust mechanical properties and high ionic conductivity at wide range of humidity conditions.

Accordingly, an improved polymer electrolyte molecular architecture and a process of synthesizing such a polymer electrolyte are desired.

SUMMARY OF THE INVENTION

The present invention solves one or more problems of the prior art by providing in at least one embodiment a polymer composition comprising polymer segments 1 and 2:

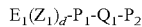  [1]

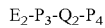  [2]

connected by a linking group $L_1$ to form polymer unit

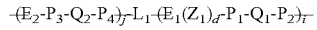  [3]

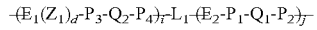  [4]

wherein:

$Z_1$ is a protogenic group such as —SO$_2$X, —PO$_3$H$_2$, —COX, and the like;

$E_1$ is an aromatic-containing moiety;

$E_2$ is an unsulfonated aromatic-containing and/or aliphatic-containing moiety;

$L_1$ is a linking group;

X is an —OH, a halogen, an ester, or

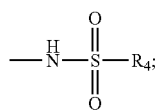

d is a number of $Z_1$ functional groups attached to $E_1$;

$P_1$, $P_2$, $P_3$, $P_4$ are each independently absent, —O—, —S—, —SO—, —SO$_2$—, —CO—, —NH—, NR$_2$—, —R$_3$—, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, —CF$_2$CF$_2$O—, perfluoroalkyl ether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$Q_1$, $Q_2$ are each independently a fluorinated cyclobutyl moiety;

i is a number representing the repetition of polymer segment 1; and, j is a number representing the repetition of a polymer segment 2.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein:

FIGS. 2C and 2D provide a table provide endcap groups and the associated linking groups;

FIGS. 8B and 8C provide a table giving the functional groups and chemistries used in FIG. 8A;

DETAILED DESCRIPTION OF THE PREFERRED EMBODIMENT(S)

Figure 1:
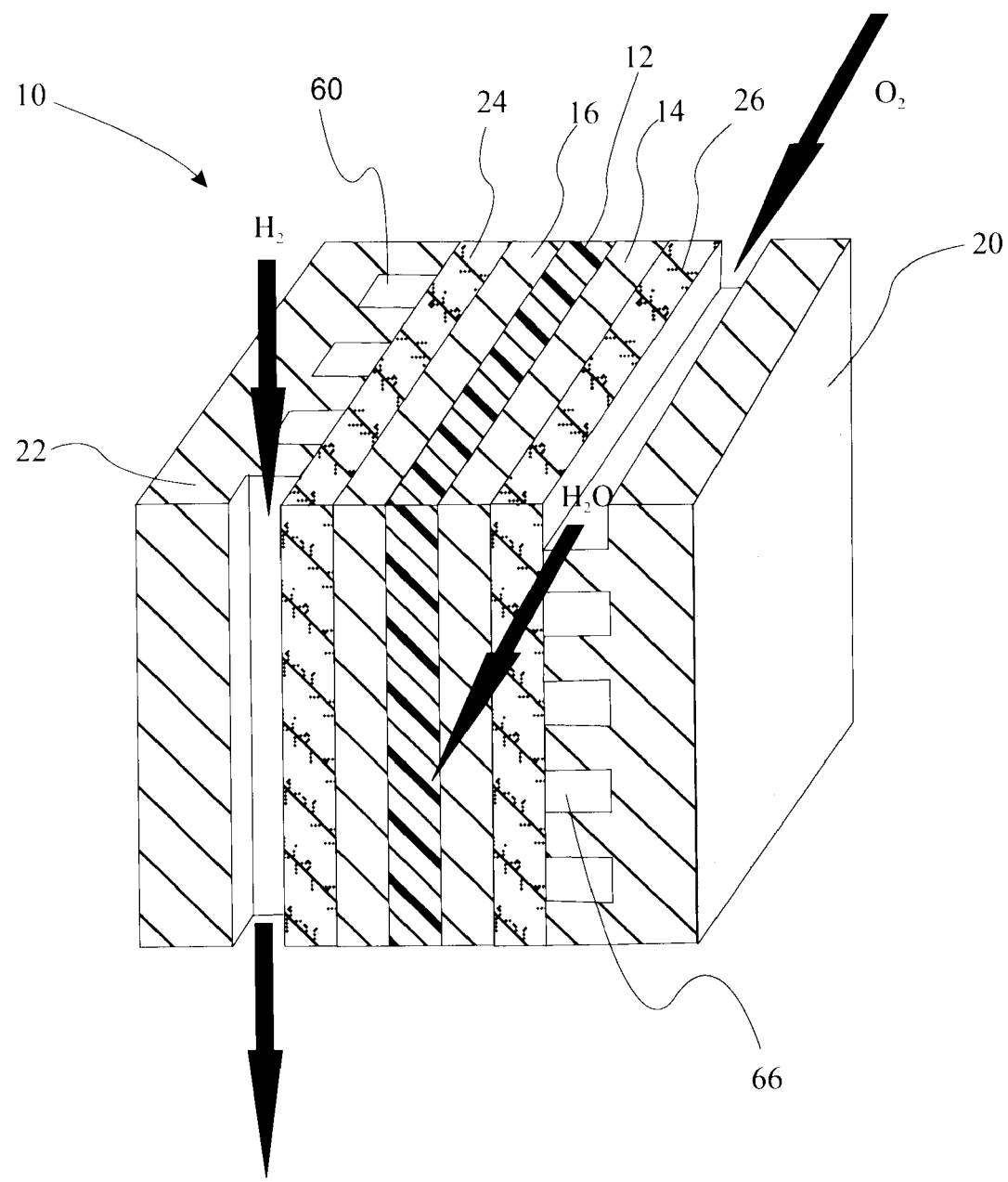
FIG. 1 provides a schematic illustration of a fuel cell incorporating the polymers of an embodiment of the present invention.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

With reference to FIG. 1, a fuel cell that incorporates a polymer electrolyte including polymers from the invention is provided. PEM fuel cell 10 includes polymeric ion conductive membrane 12 disposed between cathode catalyst layer 14 and anode catalyst layer 16. Polymeric ion conductive membrane 12 includes one or more of the polymers set forth below.

Fuel cell 10 also includes conductive plates 20, 22, gas channels 60 and 66, and gas diffusion layers 24 and 24.

In an embodiment of the present invention, a block copolymer comprises a sulfonatable or sulfonated polymer segment and an unsulfonatable or un-sulfonated polymer segment. An example of the block copolymer of at least one embodiment comprises polymer segments 1 and 2:

   [1]

   [2]

connected by a linking group $L_1$ to form polymer units 3 and 4:

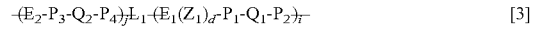   [3]

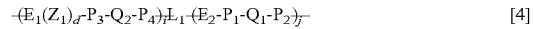   [4]

wherein:

$Z_1$ is a protogenic group such as —$SO_2X$, —$PO_3H_2$, —COX, and the like;

$E_1$ is an aromatic-containing moiety;

$E_2$ is an unsulfonated aromatic-containing and/or aliphatic-containing moiety;

$L_1$ is a linking group;

X is an —OH, a halogen, an ester, or

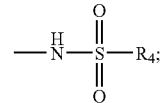

d is a number of $Z_1$ functional groups attached to $E_1$;

$P_1$, $P_2$, $P_3$, $P_4$ are each independently absent, —O—, —S—, —SO—, —$SO_2$—, —CO—, —NH—, $NR_2$—, —$R_3$—, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$Q_1$, $Q_2$ are each independently a fluorinated cyclobutyl moiety;

i is a number representing the repetition of polymer segment 1; and, j is a number representing the repetition of a polymer segment 2.

In a refinement of this variation, i and j are each independently from 1 to 500. In another refinement of this variation, i and j are each independently from 1 to 200. In still another refinement of this variation, i and j are each independently from 1 to 35. In yet another refinement of this variation, i and j are each independently from 5 to 60. In yet another refinement of this variation, i and j are each independently from 5 to 35.

In a variation of the present embodiment, polymer segment 1 is formed by sulfonating the following polymer segment:

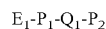

In another variation of the present invention, $Q_1$, $Q_2$ are perfluorocyclobutyl moieties. Examples of perfluorocyclobutyl moieties may include, but are not limited to formulas 5 or 6

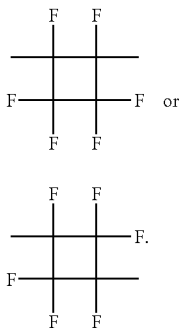

Formulae 7 and 8 provides more specific examples of polymer units 3 and 4:

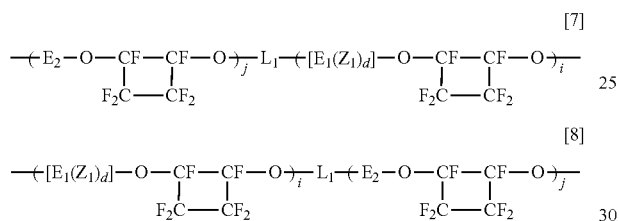

In a variation of the present embodiment, polymer segments 3 and/or 4 may be repeated to form:

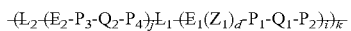

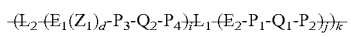

where $L_2$ is absent or a linking group and k is an integer representing the repetition of the polymer units 3 or 4.

In another variation of the present invention, $L_1$ and $L_2$ each independently comprise an ether, imide, amide, ester, amine, ketone or acyl groups. Examples of $L_1$ and $L_2$ may include, but are not limited to, the following linking groups

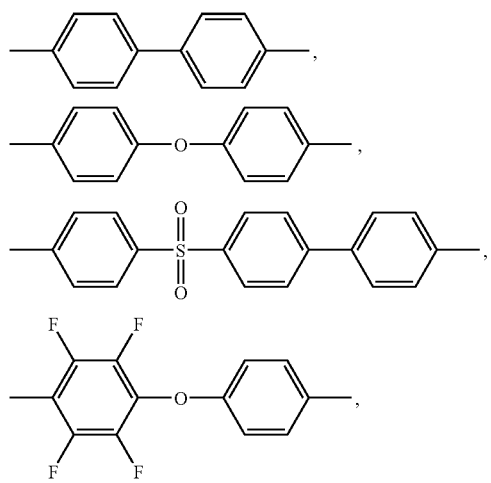

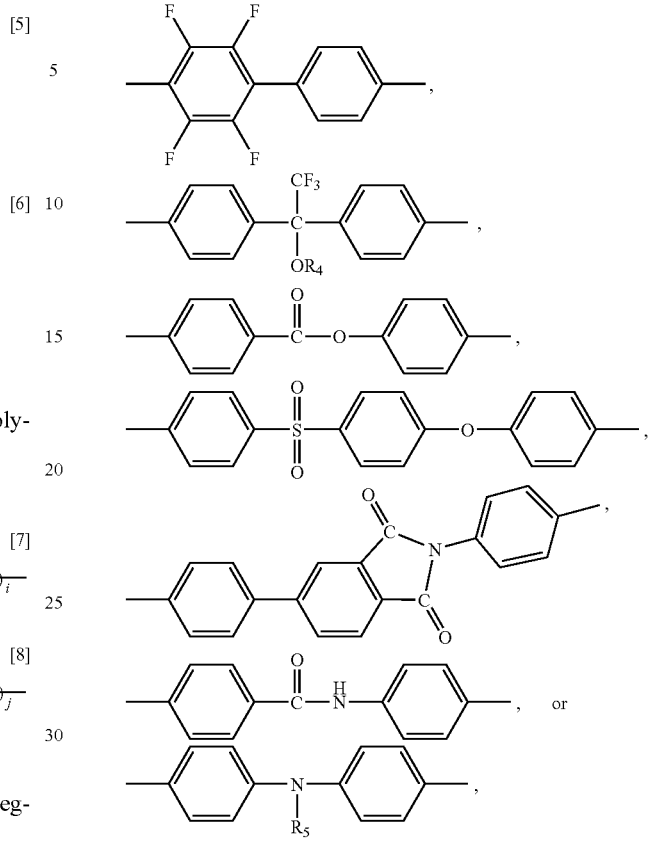

where $R_5$ is an organic group, such as an alkyl or acyl group.

The ionic conductivity of the polymers set forth above is determined by the concentration of sulfonic acid groups in the copolymer molecule. Concentration of sulfonic acid group may be experimentally determined or calculated in terms of ion exchange capacity (IEC), in the unit of milliequivalent per gram (meq/g). IEC of a known polymer structure may be calculated by simply dividing the molar equivalent of sulfonic acid groups in a polymer molecule by the molecular weight of the polymer, and multiplying the result by 1000. For sulfonated polymers with unknown degree of sulfonation, IEC can be determined experimentally. The experimental procedure for determining IEC is fully described in U.S. Pat. No. 7,094,851. By controlling the molar ratio of sulfonated/sulfonatable monomer to the un-sulfonated monomer and the degree of sulfonation, one can obtain an IEC of about 0.1 to about 8 meq/g for the sulfonated copolymer. The copolymer having an IEC of about 1 to about 4 meq/g exhibits high ionic conductivity and yet good mechanical properties at high relative humidity.

In another variation of the present embodiment, $E_1$ and $E_2$ include one or more aromatic rings. For example, $E_1$ and $E_2$, include one or more of phenyl, biphenyl, terphenyl, naphthalenyl, phenanthrenyl, diphenyl ether, 9,9'-diphenylfluorene, diphenylsulfide, diphenylcyclohexyl methane, diphenyidimethylsilane, α-methylstilbene, hydroquinone diphenyl ether, sulfonated phenyl, α-methylstilbene, diphenylcyclohexyl methane or bisphenol A. In a perfluorocyclobutane block copolymer, $E_1$ is typically different from $E_2$. In one further refinement, $E_1$ is a sulfonatable aromatic moiety while $E_2$ is not.

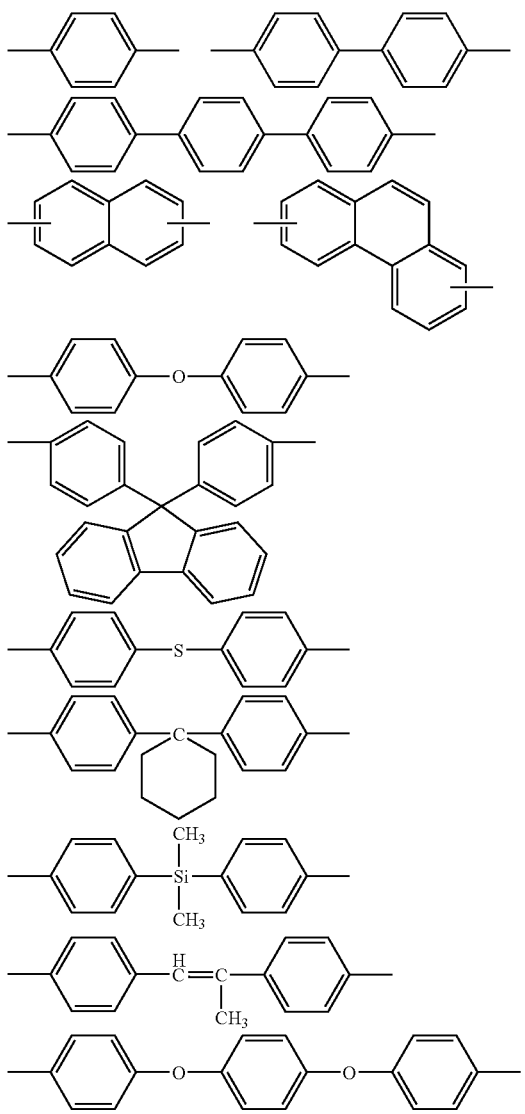

In refinement of the present embodiment, the combination of $E_1$ and $E_2$ are chosen such that $E_1$ can be selectively sulfonated without affecting $E_2$ in an oligomer or a polymer comprising both $E_1$ and $E_2$. Examples of $E_2$ useful in this refinement include, but not limited to, one or more of the following functional groups diphenyl sulfone, triphenylphosphate, 2,2'-diphenyl hexafluoropropane, and diphenylketone:

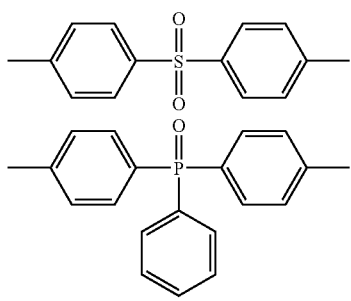

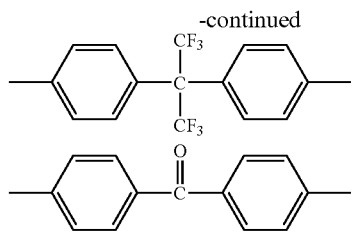

Moiety $E_1(Z_1)_d$ may contain at least one protogenic groups. In other words, d may be an integer of 1 or greater. For example, $E_1$ may be a sulfonated biphenyl moiety having one, two, three, or four sulfonic acid groups attached to the biphenyl moiety.

Figure 2A:
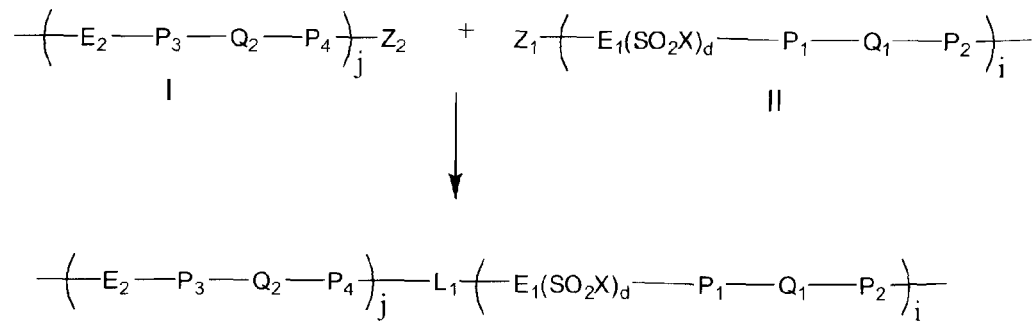
FIG. 2A provides a synthetic scheme for preparing the polymers of the present embodiment by coupling pre-polymers I and II.
Figure 2B:
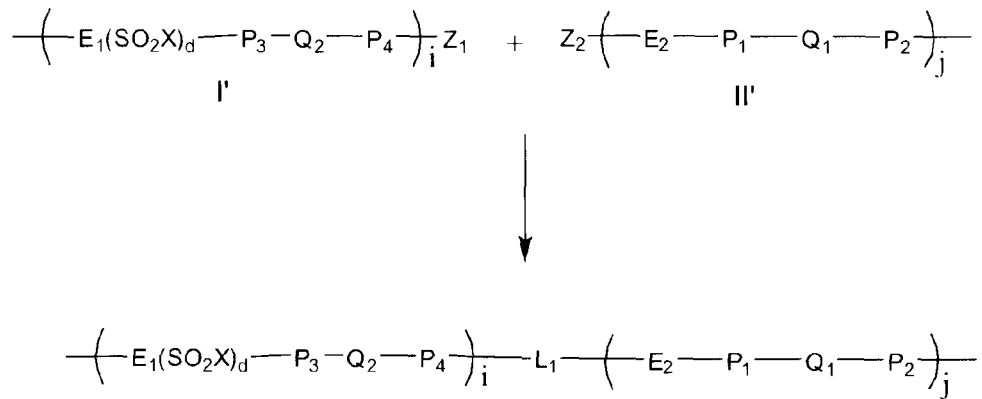
FIG. 2B provides a synthetic scheme for preparing the polymers of the present embodiment by coupling pre-polymers I' and II'.

FIGS. 2A and 2B provide synthetic schemes for preparing the polymers of the present embodiment by coupling pre-polymers I and II or pre-polymers I' and II'. In these figures $E_1$, $E_2$, $L_1$, $P_1$, $P_2$, $P_3$, $P_4$, $Q_1$, $Q_2$, and d are as set forth above and $Z_1$ and $Z_2$ are reactive end groups. 2C and 2D provide a table of endcap groups and the associated linking groups. The reactive end groups of the pre-polymers react with each other, resulting in linking group $L_1$ between the pre-polymers. There are no limitations on the chemical structure of the linking group. Various linking groups, for examples, may be formed as the product of reactions between different end groups described above. The chemical reactions between the end groups may include, but not limited to, Suzuki coupling reaction, Grignard reagent coupling reactions, Friedel-Crafts reaction, condensation reactions (between an acid and an alcohol, an acid and an amine, for examples), electrophilic substitution reactions, nucleophilic substitution reactions, radical coupling reaction, and imidization reactions.

Figure 3A:
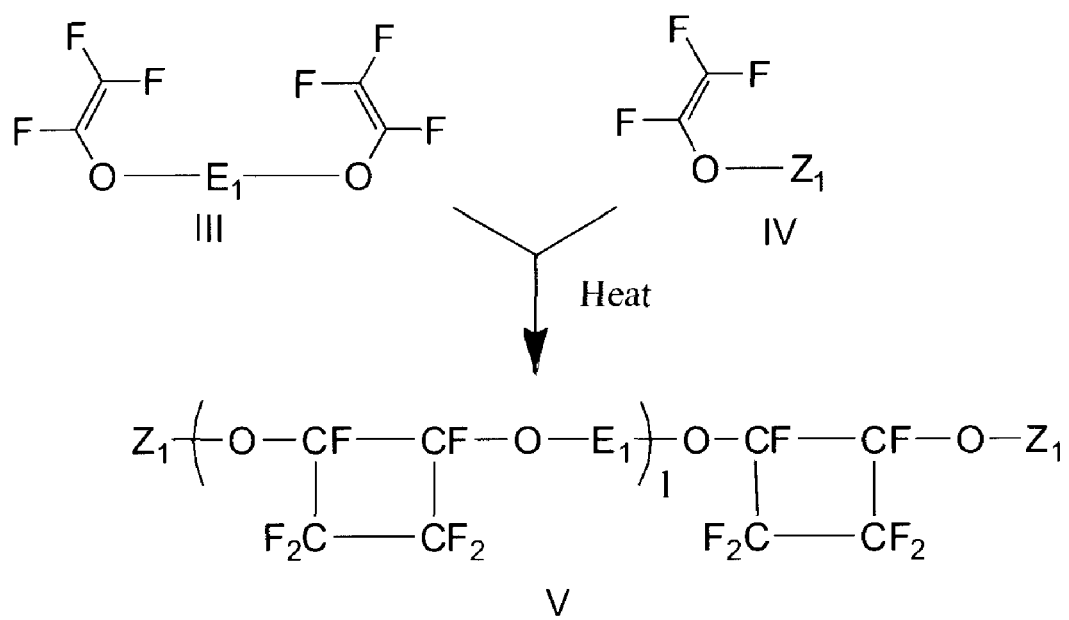
FIG. 3A provides a synthetic scheme in which a sulfonatable di(trifluorovinyl)ether monomer III is polymerized with mono-trifluorovinyl ether monomer IV.
Figure 3B:
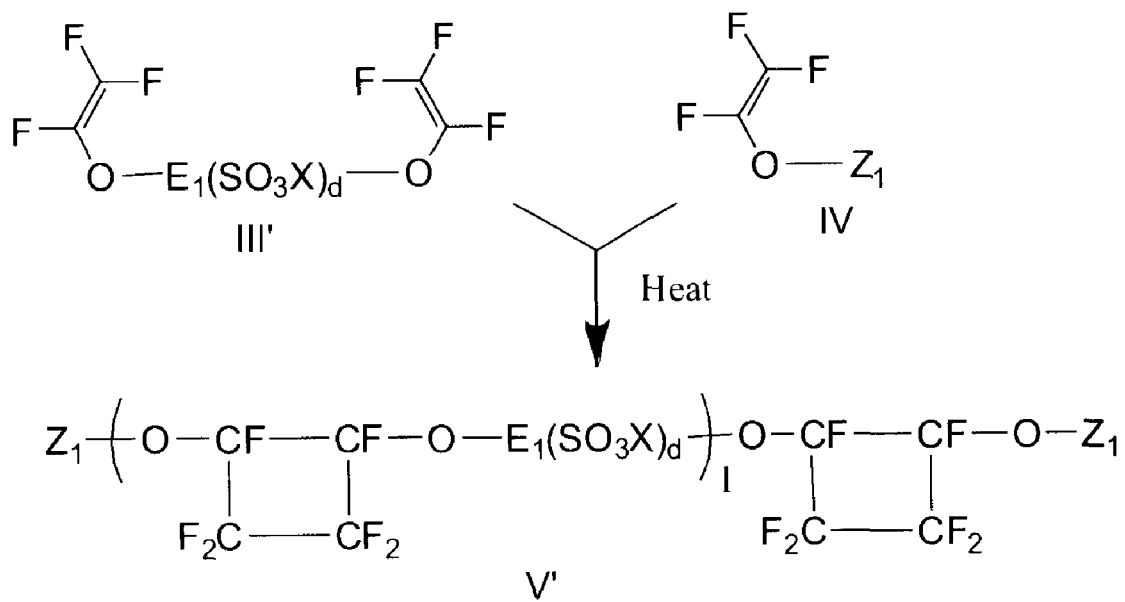
FIG. 3B provides a synthetic scheme in which sulfonated di(trifluorovinyl)ether monomer III' is polymerized with a mono-trifluorovinyl ether monomer IV.

In one variation, one of the pre-polymers may comprise a sulfonatable or sulfonated group, while another pre-polymer may comprise an un-sulfonatable or un-sulfonated group. The pre-polymers may be prepared by polymerizing at least one monomer having at least 2 polymerizable functionalities along with a monomer with one polymerizable functionality and at least one reactive organic group. FIG. 3A provides a synthetic scheme in which a sulfonatable di(trifluorovinyl) ether monomer III is polymerized with mono-trifluorovinyl ether monomer IV to form pre-polymer V. FIG. 3B provides a synthetic scheme in which sulfonated di(trifluorovinyl) ether monomer III' or segment is polymerized with a mono-trifluorovinyl ether monomer IV to form pre-polymer V'. In these figures $E_1$, X, and d, are as set forth above, $Z_1$ and $Z_2$ are reactive end groups, and I is positive integer representing the degree of polymerization of this pre-polymer. The degree of polymerization may be controlled by selecting the molar ratio of the two monomers. Therefore, the higher the molar ratio of the divinyl monomer to the vinyl monomer, the higher the degree of polymerization.

Figure 4:
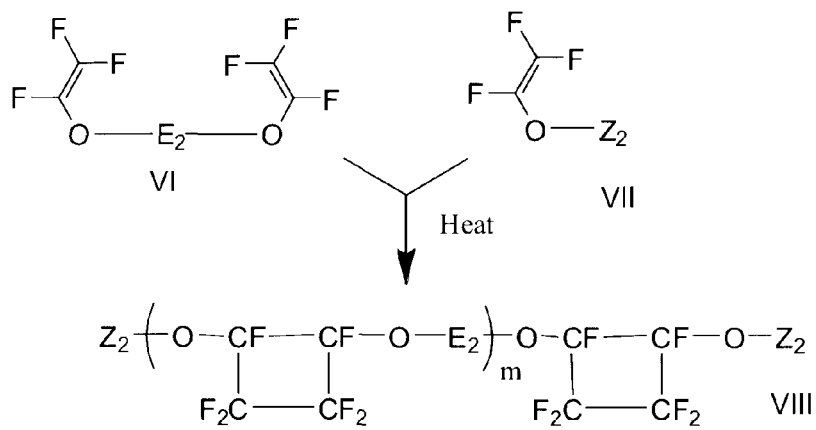
FIG. 4 provides another synthetic scheme in which an un-sulfonatable or un-sulfonated di(trifluorovinyl)ether monomer is polymerized with a mono-trifluorovinyl ether monomer to form a pre-polymer.
Figure 5:
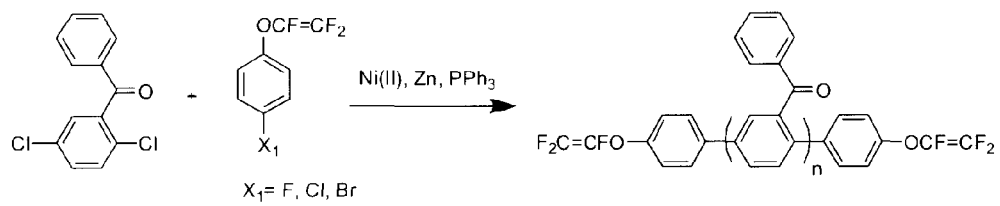
FIG. 5 provides a scheme for preparing a sulfonatable macro-monomer.

FIG. 4 provides another synthetic scheme in which un-sulfonatable or un-sulfonated di(trifluorovinyl)ether monomer VI is polymerized with mono-trifluorovinyl ether monomer VII to form pre-polymer VIII. In this scheme, $E_2$ is as set forth above, $Z_2$ are reactive end groups, and m is a positive integer representing the degree of polymerization of the pre-polymer. As set forth above, the degree of polymerization can be controlled by selecting the ratio of the two monomers.

Sulfonated or sulfonatable monomers with at least 2 polymerizable functionalities may include, for examples, di(trifluorovinyl)monomers, tri(trifluorovinyl)monomers and tetra(trifluorovinyl)monomers. The monomer may comprise an electron rich aromatic group that can readily undergo direct sulfonation reactions, Friedel-Crafts reactions, or lithiation reactions. Non-limiting examples of sulfonatable monomers may include, 4,4'-bis(4-trifluorovinyloxy)biphenyl, 9,9-bis(4-trifluorovinyloxyphenyl)fluorene, 1,1,1-tris[(4-trifluorovinyloxy)phenyl]ethane, which are available from Oakwood Products, Inc. (West Columbia, S.C.). Sulfonatable macro-monomers may also be used including, but not limited to, sulfonatable monomers III provided by the following representative chemical formulas:

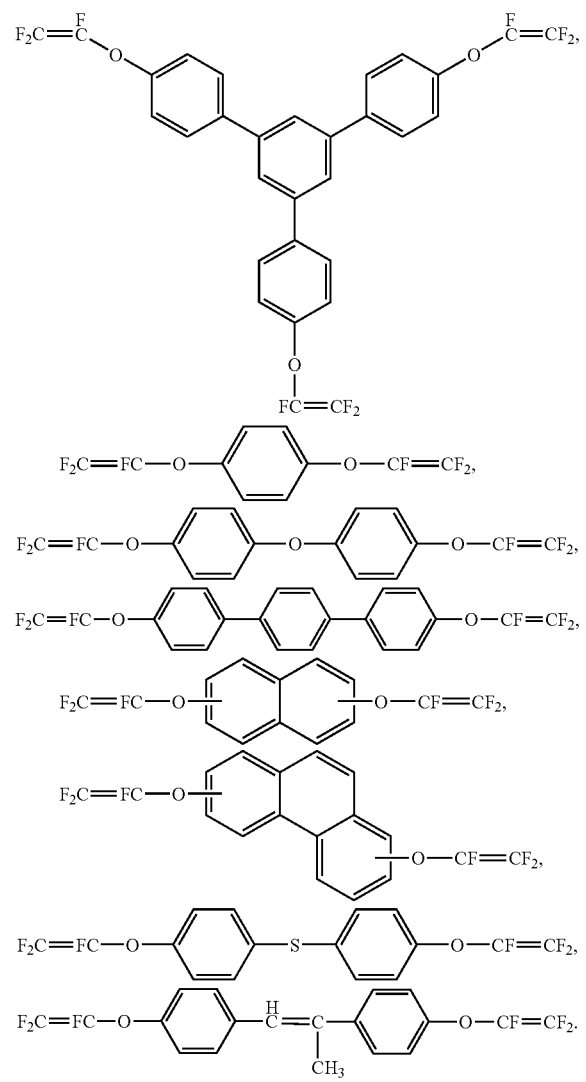

Figure 6A:
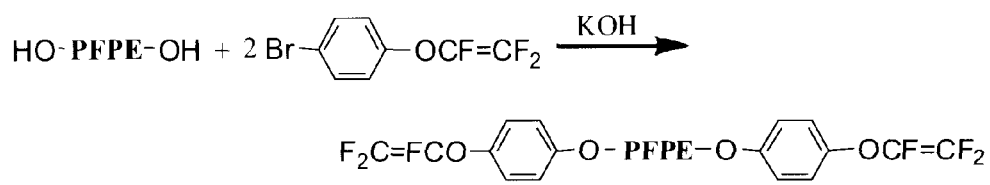
FIG. 6A provides a reaction scheme for preparing a perfluorinated polyether.
Figure 6B:
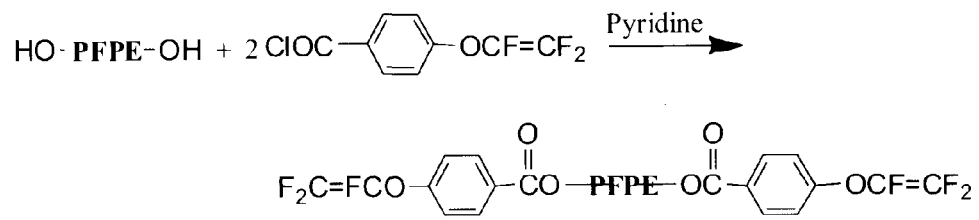
FIG. 6B provides a reaction scheme for preparing a perfluorinated polyether.
Figure 7A:
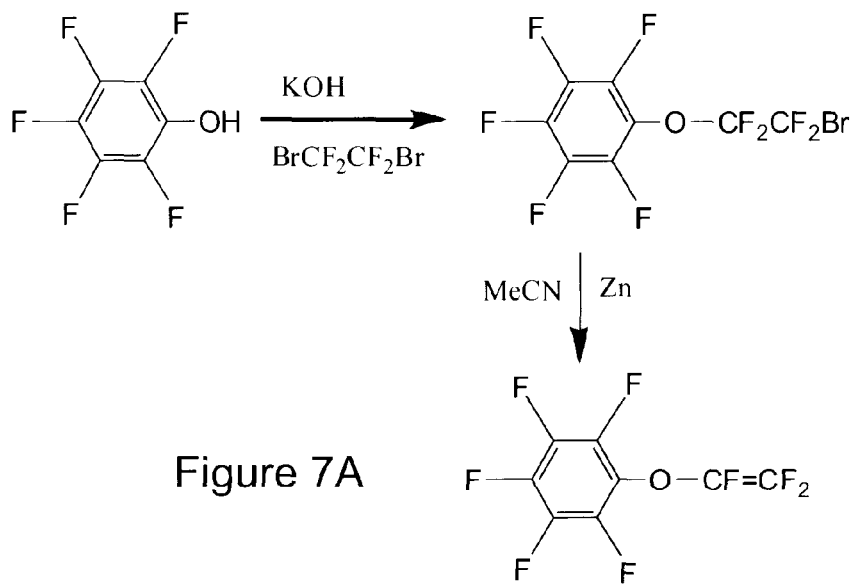
FIGS. 7A-7E provide reaction schemes for preparing mono-trifluorovinyl monomers.
Figure 7B:
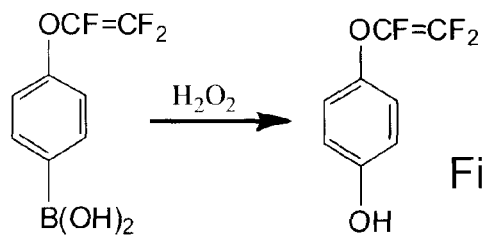
Figure 7C:
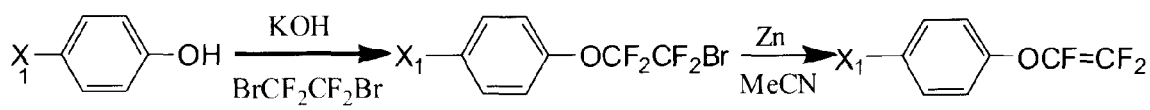
Figure 7D:
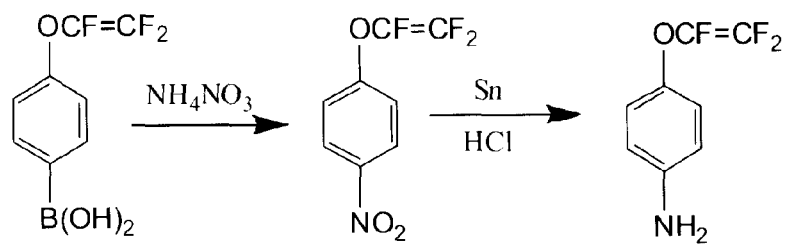
Figure 7E:
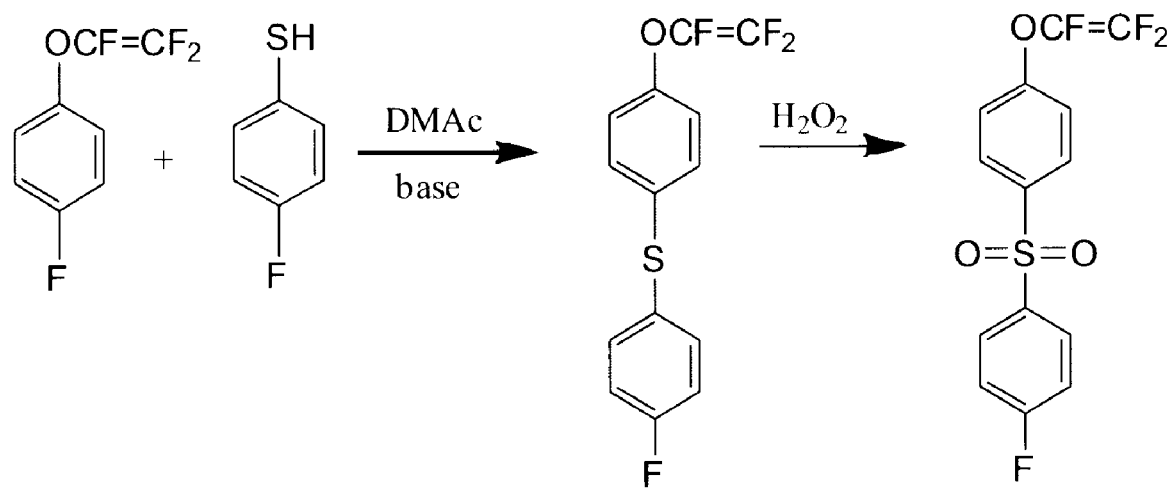

Un-sulfonatable or unsulfonated monomers with at least 2 polymerizable functionalities may include, for examples, 2,2'-bis(4-trifluorovinyloxyphenyl)-1,1,1,3,3,3-hexafluoropropane, available from Oakwood Products, Inc. (West Columbia, S.C.). Un-sulfonatable macro-monomers may also be used. Two types of perfluorinated polyether based bis(trifluorovinyloxyphenyl)monomers, for examples, are prepared according to the reaction schemes of FIGS. 6A and 6B. In these figures, HO-PFPE-OH is a perfluorinated polyether having at least 2 hydroxyl end groups. Examples of perfluorinated polyether with hydroxyl end groups include Fomblin available from Solvay Solexis, poly(tetrafluoroethylene oxide-co-difluoromethylene oxide) α,ω-diol ($HOCH_2CF_2O(CF_2CF_2O)_x(CF_2O)_yCF_2CH_2OH$), and poly(hexafluoropropylene oxide) ($HO[CF(CF_3)CF_2O]_nH$). Poly(tetrafluoroethylene oxide-co-difluoromethylene oxide) α,ω-diol and poly(hexafluoropropylene oxide) are available from Aldrich. 4-Trifluorovinyloxyphenylbromide and 4-trifluorovinyloxybenzoic chloride used in the above reactions are available from Oakwood Products, Inc. (West Columbia, S.C.). Other non-limiting examples of un-sulfonatable and un-sulfonated monomers are shown in the following representative chemical formulas:

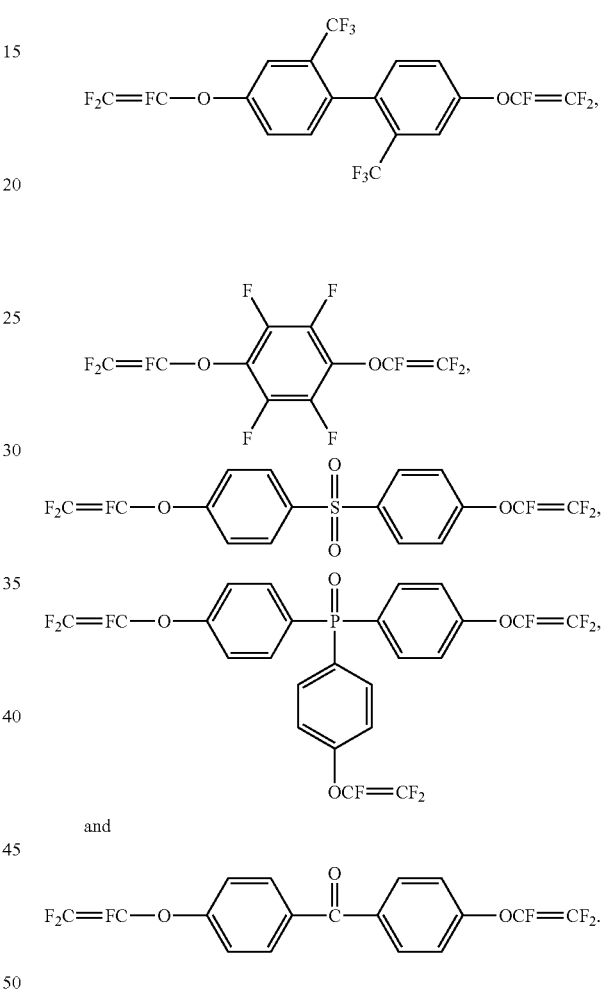

and

Any monomers having one trifluorovinyl group and another reactive organic group may be used as the mono-trifluorovinyl monomer. Examples of mono-trifluorovinyl monomers may include trifluorovinyloxyphenyl bromide, trifluorovinyloxyphenyl boronic acid, trifluorovinyloxybenzoic acid, and trifluorovinyloxybenzoic chloride, all of which are available from Oakwood Products, Inc. (West Columbia, S.C.). Other non-limiting examples of mono-trifluorovinyl monomers are prepared according to the reaction schemes of FIGS. 7A through 7E. In these figures $X_1$ is a chlorine, fluorine or bromine atom.

Additionally, monomers with anhydride or imide functionality represented by the following chemical formulas may be prepared using known organic chemical reactions as well.

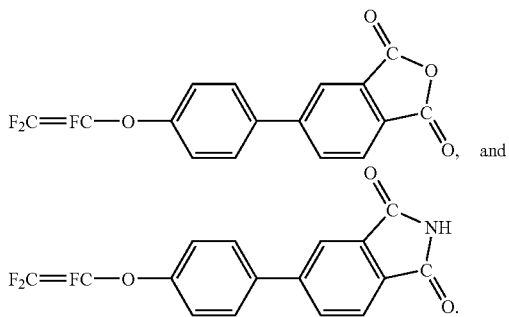

A mono-trifluorovinyl monomer having a boronic ester reactive group available from Oakwood Products, Inc., as shown in the following formula, may also be used.

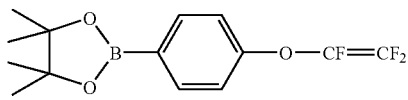

A sulfonatable pre-polymer may be prepared by polymerizing at least one sulfonatable monomer with at least 2 polymerizable functionalities and at least one monomer with one polymerizable functionality and a reactive organic group. The molecular weight or degree of polymerization of the pre-polymer may be controlled by selecting the proper molar ratio of the sulfonatable monomer to the monomer with one functionality. The polymerizable functionality may include a trifluorovinyl group. It is known that the trifluorovinyl group can undergo a thermal addition reaction (or so-called thermal dimerization reaction) to form a perfluorocyclobutane group, thus linking the corresponding monomer units into a polymer chain. The thermal addition reaction is illustrated in the reaction schemes shown in FIGS. 3A and 3B. The thermal addition reaction may be carried out at a temperature between 120° C. and about 210° C. The reaction may be carried out under an inert atmosphere (such as nitrogen, helium or argon atmosphere) to prevent other un-desired side reactions. The degree of polymerization, i, may be between about 2 and about 100,000, or more preferably between 10 and about 1,000. A monomer with trifunctionalities or tetrafunctionalities may also be included in the monomer mix to prepare the pre-polymer. The trifunctional or tetrafunctional monomer may provide branching and small degree of crosslinking to the pre-polymer chain configuration.

Figure 8A:
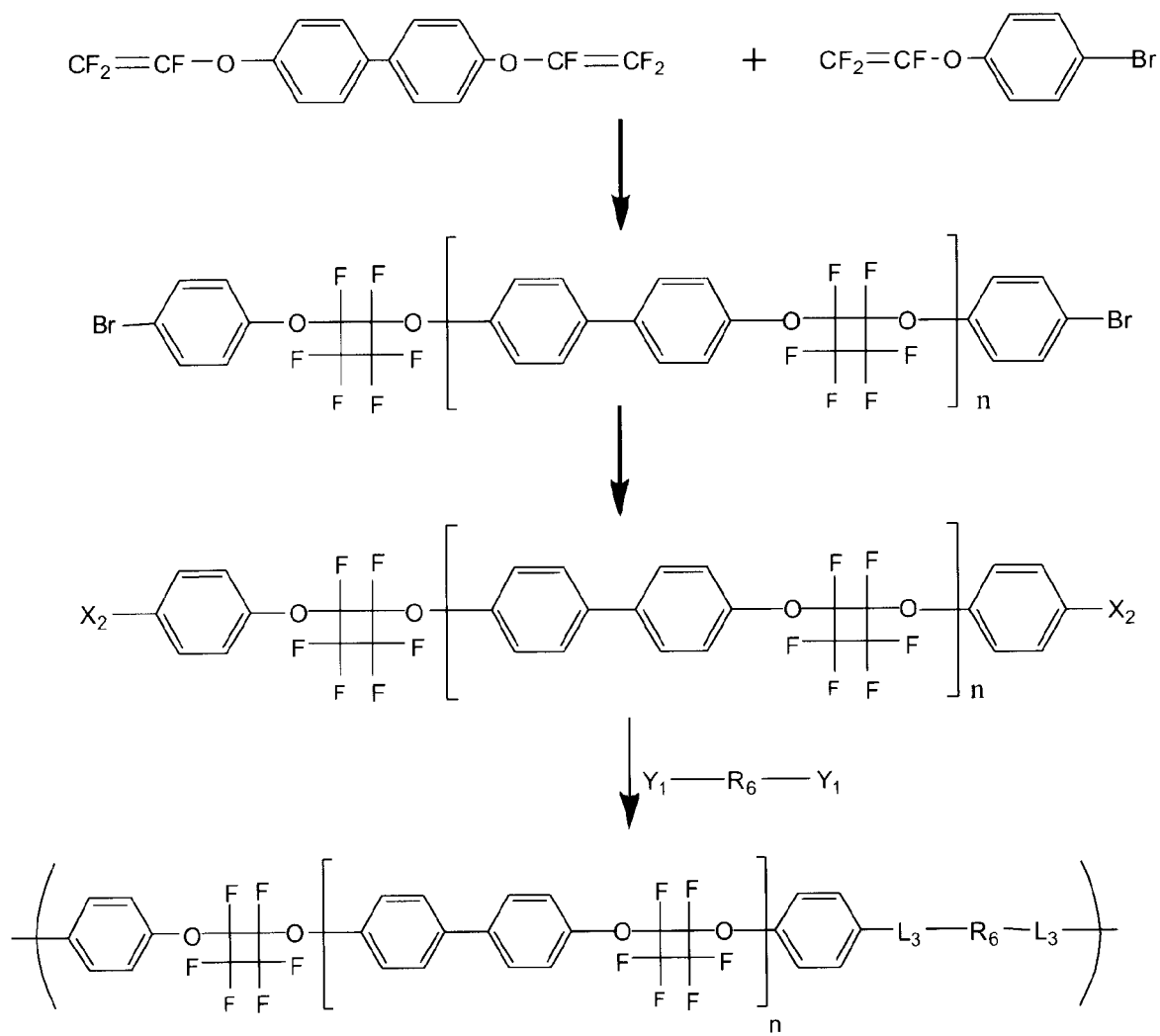
FIG. 8A provides a synthetic scheme in which 4,4'-bis(4-trifluorovinyloxy)biphenyl is used as a sulfonatable monomer with 2 functionalities, and 4-trifluorovinyloxyphenyl bromide is used as the monomer with one functionality and one reactive phenyl bromide group.
Figure 8C:
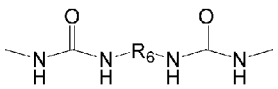
Figure 8C:
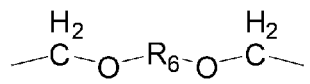
Figure 8C:
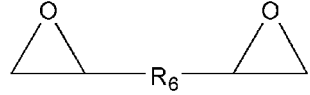
Figure 8C:
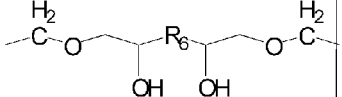
Figure 8C:
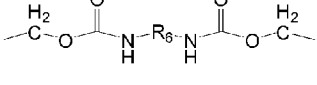
Figure 8C:
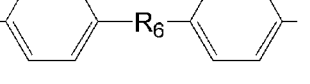
Figure 8C:
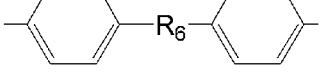
Figure 8C:
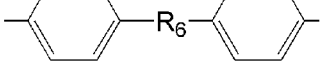

FIG. 8A provides a synthetic scheme in which 4,4'-bis(4-trifluorovinyloxy)biphenyl is used as a sulfonatable monomer with 2 functionalities, and 4-trifluorovinyloxyphenyl bromide is used as the monomer with one functionality and one reactive phenyl bromide group. The two monomers may be polymerized together to form a pre-polymer with phenyl bromide reactive end groups. This pre-polymer may be reacted with $Y_1$-$R_6$-$Y_1$ in various coupling reactions. FIGS. 8B and 8C provide a table of the coupling chemistries that may be utilized.

Figure 9:
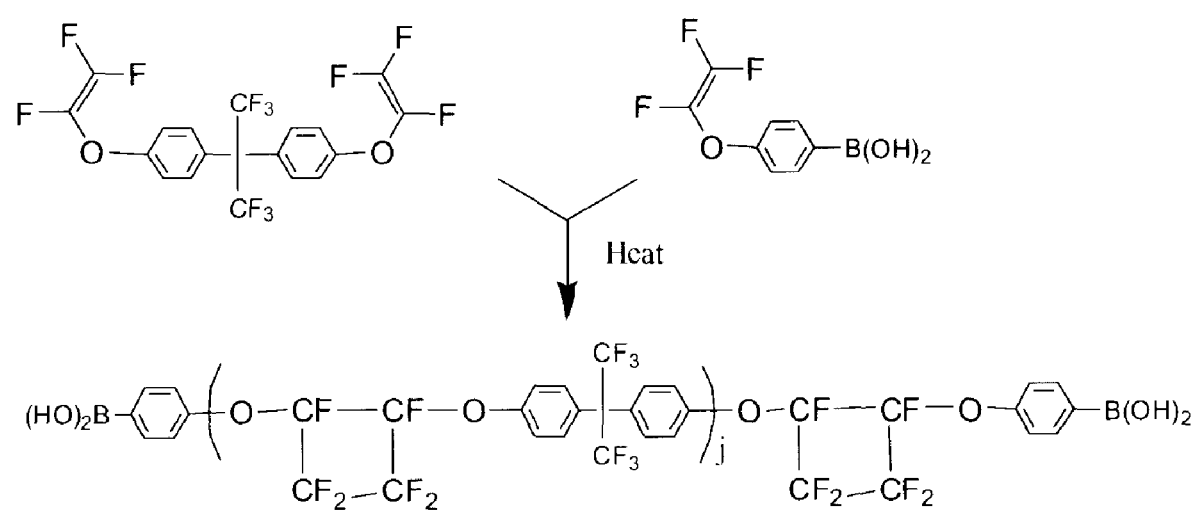
FIG. 9 shows a polymerization to form an un-sulfonatable pre-polymer with phenyl boronic acid reactive end groups.
Figure 10A:
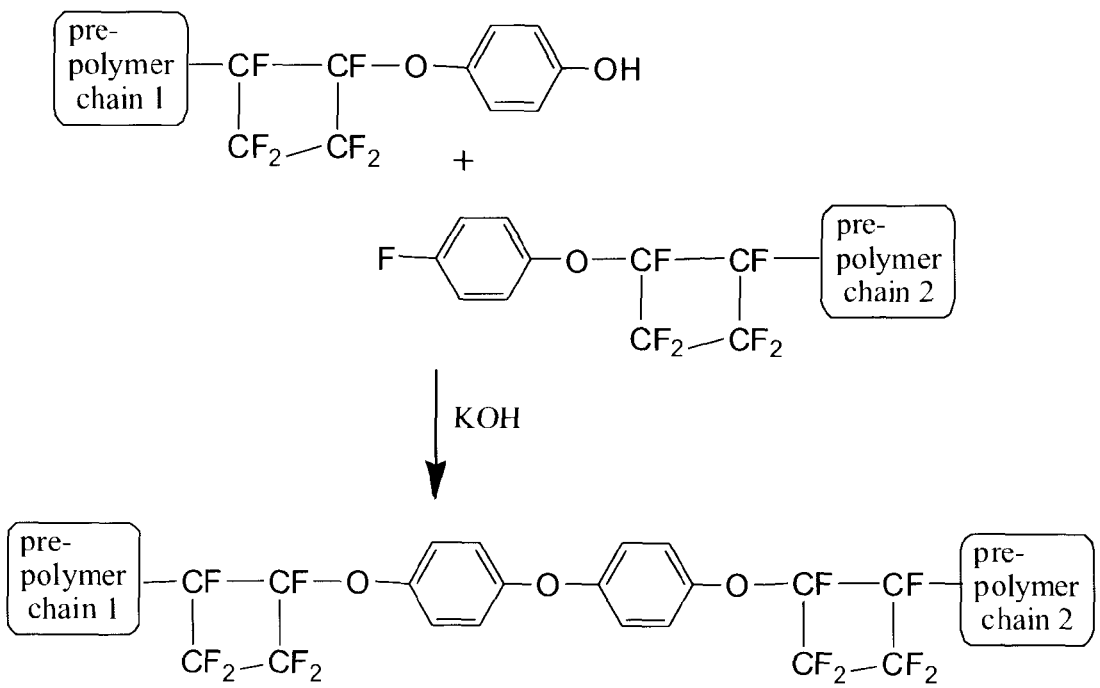
FIGS. 10A-10H provide several examples of coupling reactions used to make various polymers of the invention.
Figure 10B:
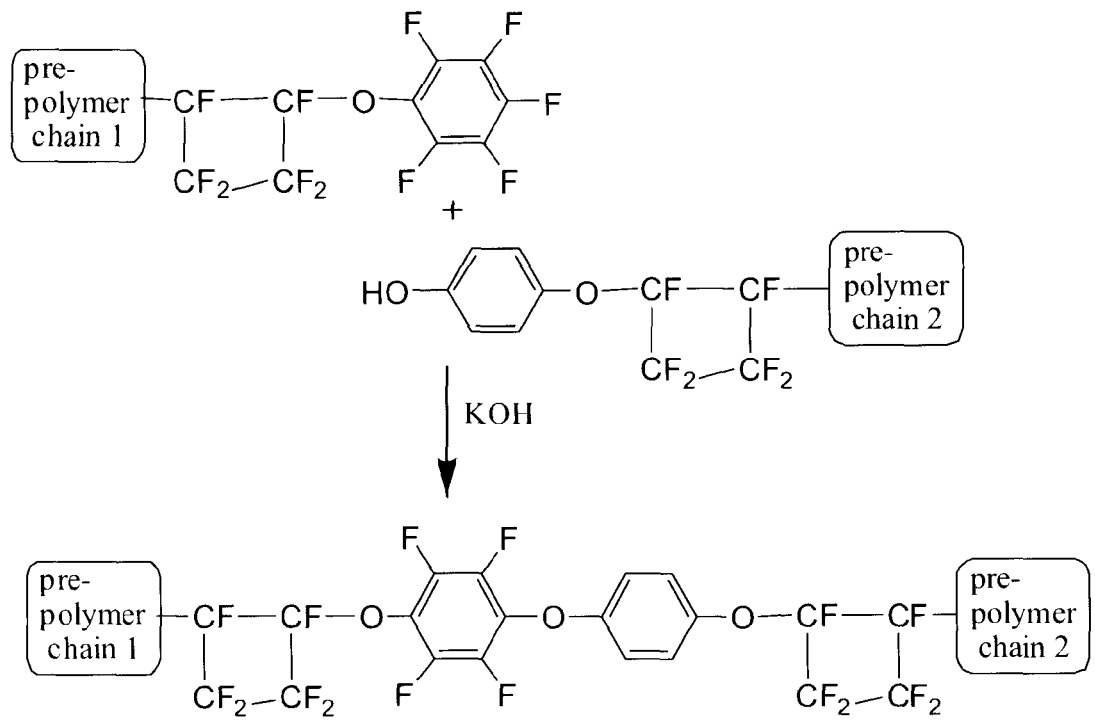
Figure 10C:
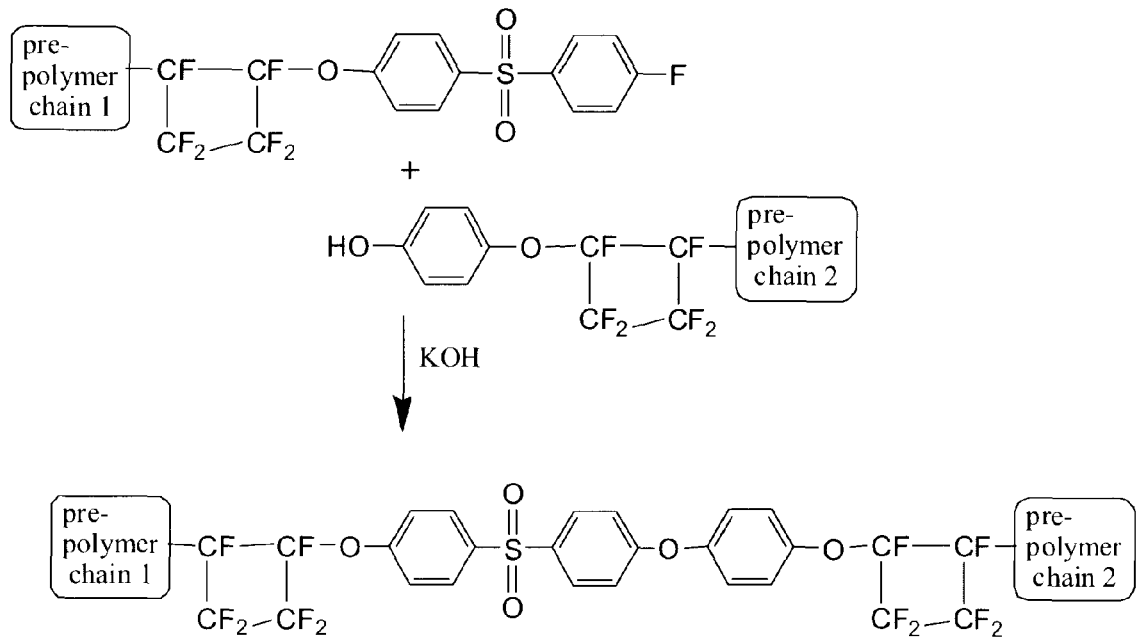
Figure 10D:
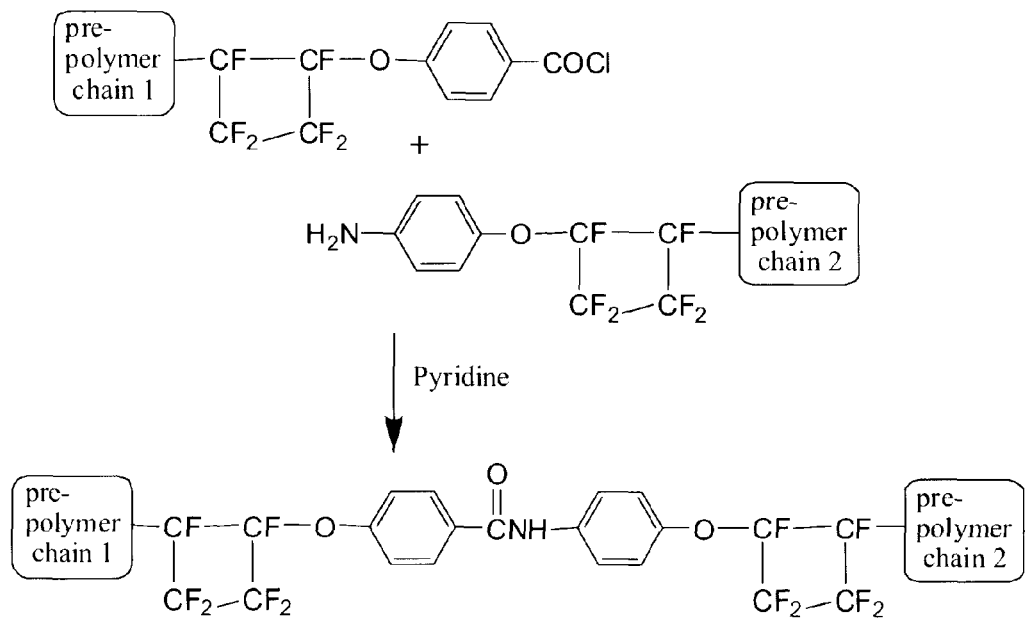
Figure 10E:
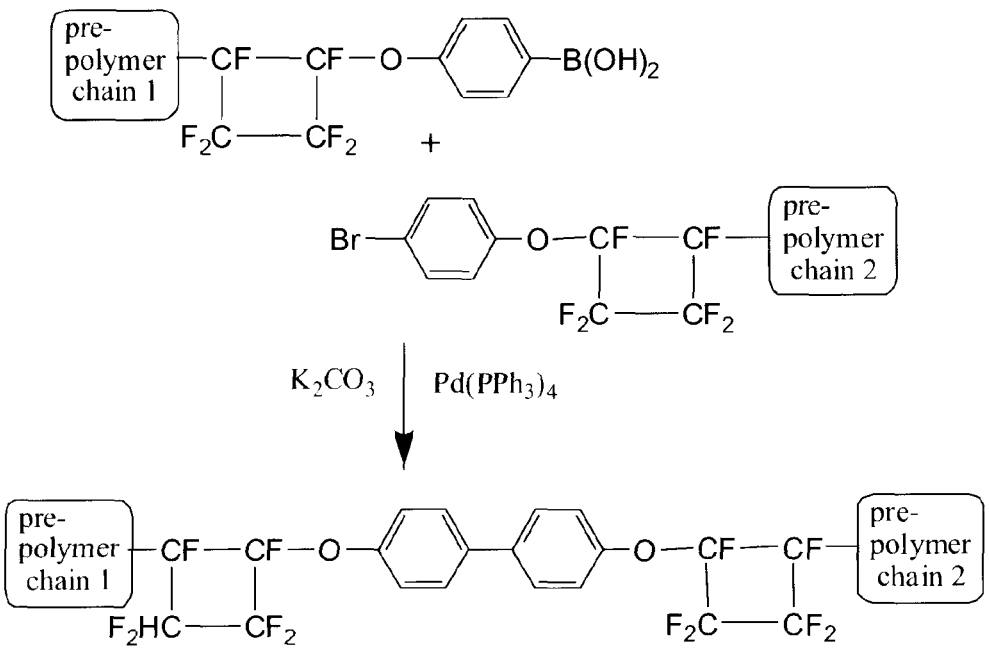
Figure 10F:
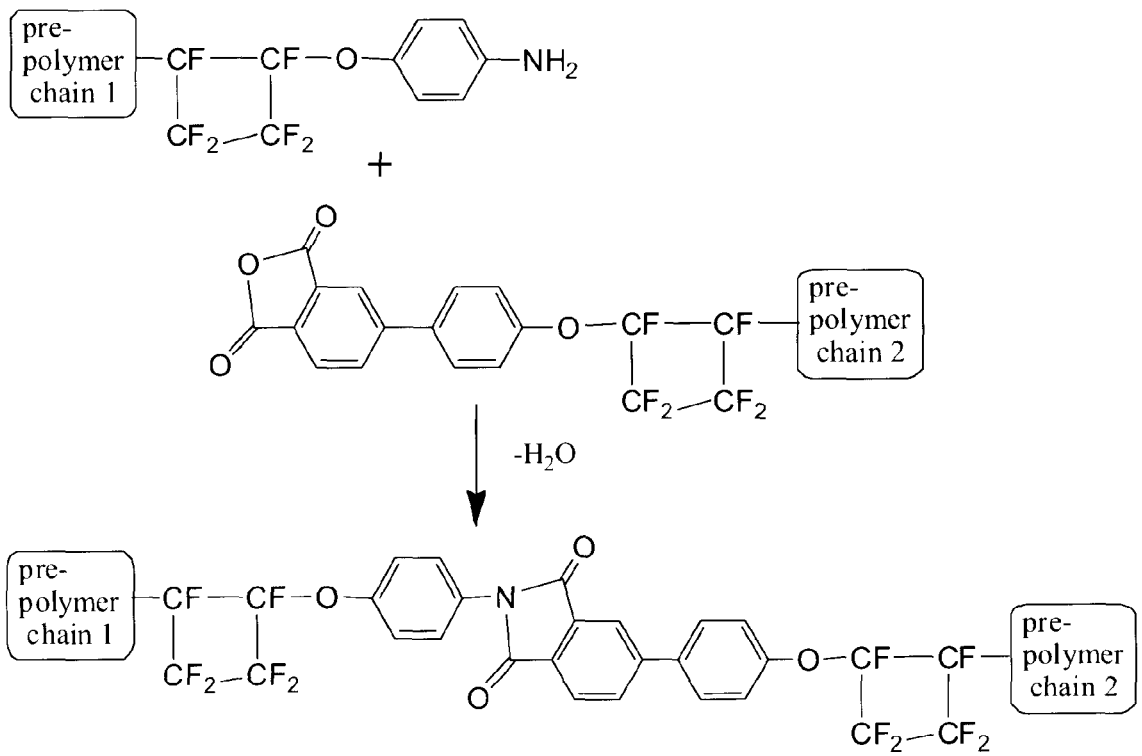
Figure 10G:
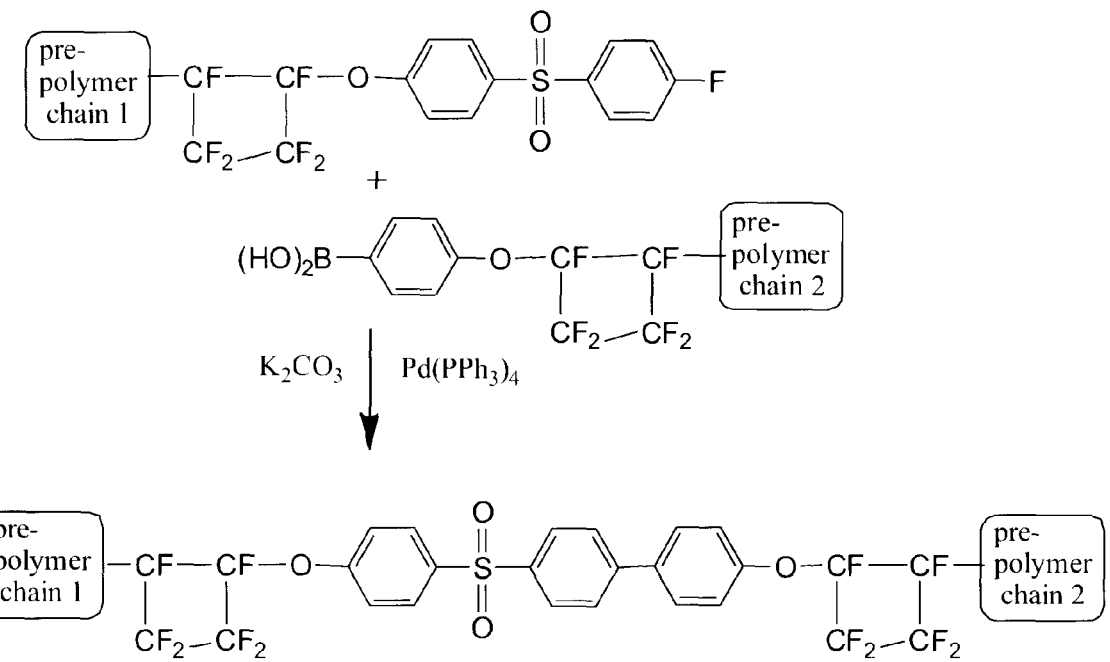
Figure 10H:
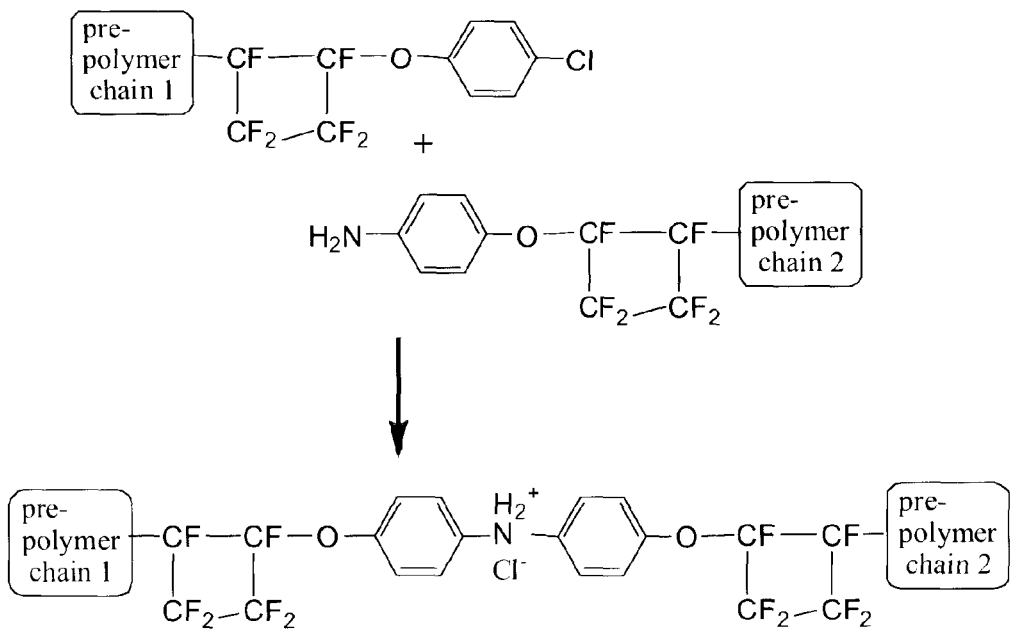

In another variation, the un-sulfonatable pre-polymer is prepared by polymerizing at least one un-sulfonatable monomer with at least 2 polymerizable functionalities and at least one monomer with one polymerizable functionality and a reactive organic group. The molecular weight or degree of polymerization of the pre-polymer may be controlled by selecting the proper molar ratio of the un-sulfonatable monomer to the monomer with one functionality. The polymerizable functionality may include trifluorovinyl group. The thermal addition reaction of trifluorovinyl groups are described above. Similarly, the degree of polymerization, i, may be between about 2 and about 100,000, or more preferably between 10 and about 1,000. A monomer with trifunctionalities or tetrafunctionalities may also be included in the monomer mix to prepare the pre-polymer. For example, 2,2'-bis(4-trifluorovinyloxyphenyl)-1,1,1,3,3,3-hexafluoropropane may be selected as an un-sulfonatable monomer with 2 functionalities, and 4-trifluorovinyloxyphenyl boronic acid is selected as the monomer with one functionality and one reactive phenyl boronic acid group. The two monomers may be polymerized together to form an un-sulfonatable pre-polymer with phenyl boronic acid reactive end groups, as shown in reaction scheme of FIG. 9.

Various other un-sulfonatable perfluorocyclobutane pre-polymers having different reactive end groups may be prepared in a similar manner.

The block copolymer may be prepared by combining at least a sulfonatable pre-polymer and an un-sulfonatable pre-polymer, and by causing a chemical reaction between their corresponding reactive end groups. Various pre-polymers with different reactive end groups may be linked together through chemical reactions to make the block copolymer. Depending on the reactive end groups, Suzuki coupling reaction, Grignard reagent coupling reactions, Friedel-Crafts reaction, condensation reactions, electrophilic substitution reactions, nucleophilic substitution reactions, radical coupling reactions, and imidization reactions may be used to couple pre-polymers together to form the block copolymer. In a Suzuki coupling reaction, a base and a metal catalyst may be used to facilitate the reaction between a reactive halide end group and a boronic acid/boronic ester end group. The base may include any inorganic and organic bases such as KOH, $K_2CO_3$, $Na_2CO_3$, $K_3PO_4$, and t-BuOK. Palladium catalyst with various organic ligands known to an ordinary skill in the art may be used in a Suzuki coupling reaction. $Pd(PPh_3)_4$, tetrakis(triphenylphosphine) palladium and $Pd(OAc)_2$, palladium acetate are two examples of Suzuki catalysts. When one of the reactive end groups is an acid halide group or an anhydride group, Friedel-Crafts reaction may be used to link two pre-polymers together. A Lewis acid catalyst, such as $AlCl_3$, may be used to facilitate the Friedel-Crafts reaction. Condensation between a carboxylic acid or acid chloride and an alcohol or amine may also be used. Similarly, substitution reactions, involving an organic halide end group and a hydroxyl end group, for example, may be used to link the pre-polymers together.

Figure 11:
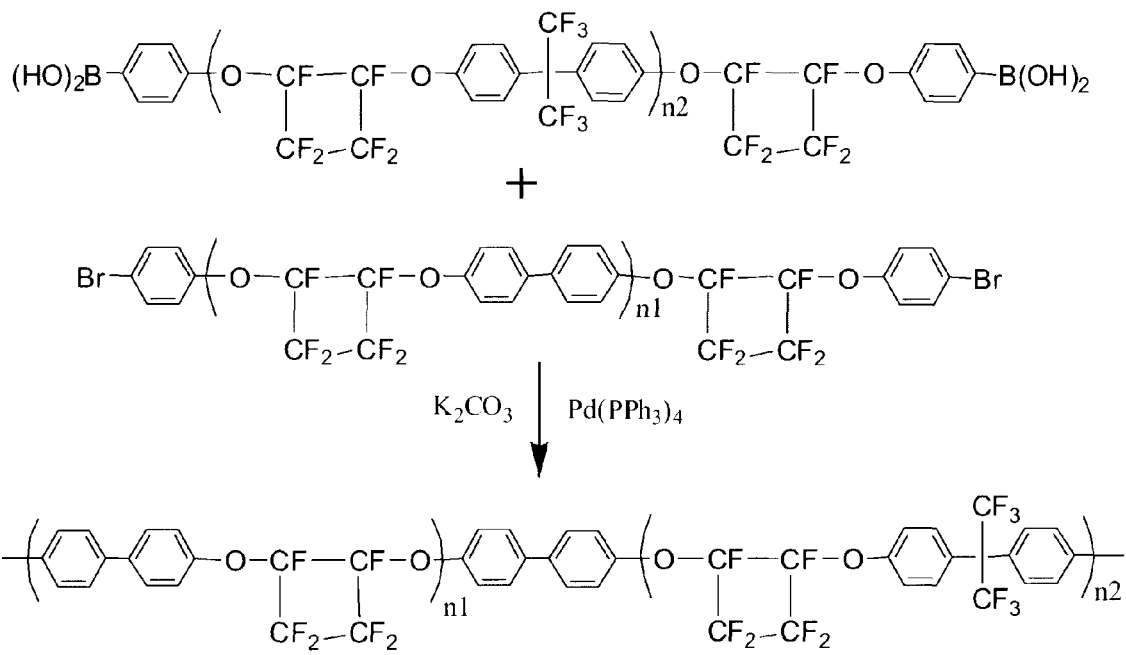
FIG. 11 provides an example of a Suzuki coupling scheme.

Several examples of such coupling reactions used to make the polymer of the invention are illustrated in reaction schemes of FIGS. 10A through 10H. In these reaction schemes, pre-polymer chain 1 may comprise a sulfonatable group or a sulfonate group while pre-polymer chain 2 is an un-sulfonatable or un-sulfonated polymer chain. One specific example involving a sulfonatable biphenyl group in a pre-polymer and an un-sulfonatable bisphenylhexafluoropropane group in another pre-polymer using a Suzuki coupling reaction is shown in reaction scheme of FIG. 11.

A block copolymer comprising a sulfonatable group may be sulfonated to convert the sulfonatable groups into sulfonate ionic groups. Direct sulfonation reactions or sulfonation reaction through spacer molecules may be used. Sulfonation reactions typically convert the sulfonatable groups in the block copolymer into sulfonated groups without affecting the un-sulfonatable groups in the polymer. The resulted sulfonated block copolymer thus comprises a sulfonated polymer segment and an un-sulfonated polymer segment. Alternatively, the sulfonatable pre-polymer may be sulfonated before reacting with un-sulfonated pre-polymers to form a sulfonated block copolymer. Additionally, sulfonated monomers may also be used to prepare the corresponding sulfonated pre-polymers. In those cases, the block copolymer or the pre-polymer may not necessarily need sulfonation reaction.

Figure 12:
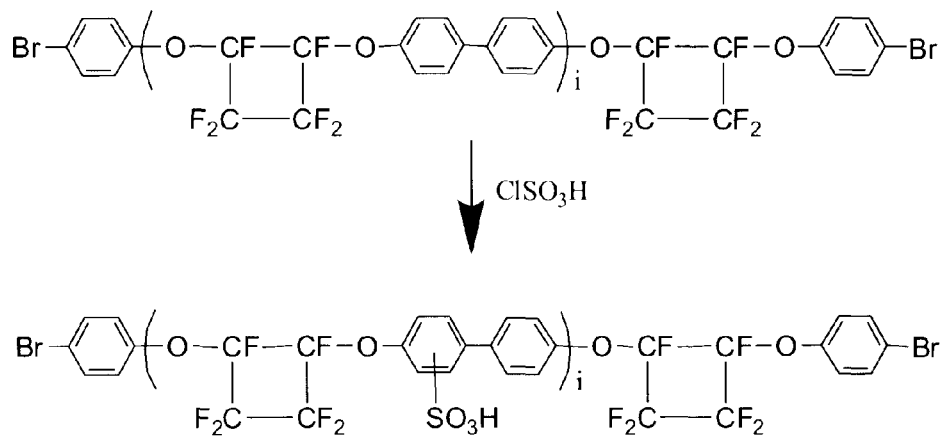
FIG. 12 provides a direct sulfonation reaction scheme.
Figure 13:
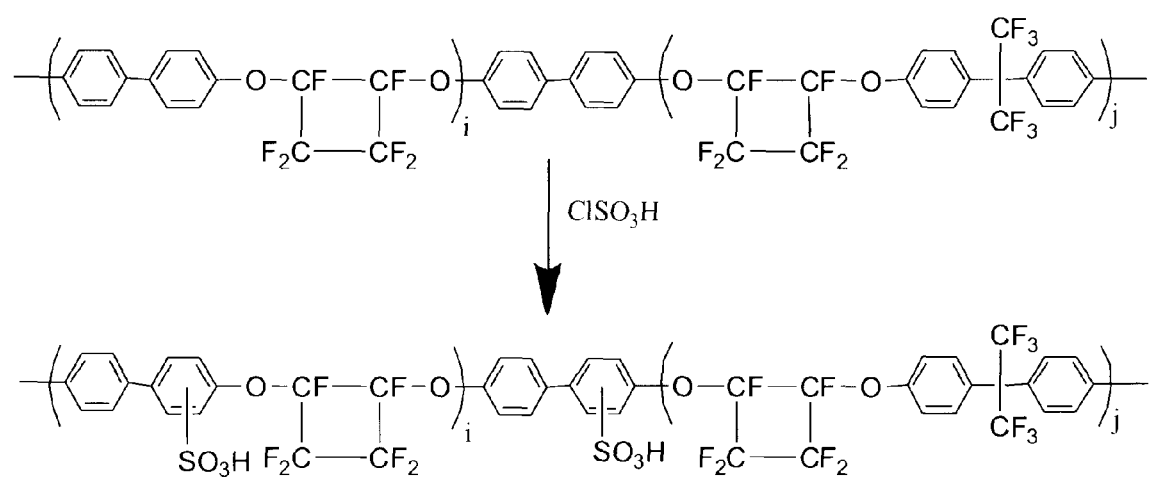
FIG. 13 provides another example of a direct sulfonation reaction scheme.

Direct sulfonation may be carried out by reacting the block copolymer or pre-polymer with a sulfonation agent. There are no limitations on the sulfonation agents. Non-limiting examples of sulfonation agent may include sulfur trioxide, oleum, sulfuric acid, chlorosulfuric acid, and fluorosulfuric acid. If the sulfonatable group is an aromatic group, sulfonation reaction may result in substitution of a hydrogen atom on the aromatic ring with a sulfonic acid or halosulfonic group. If the sulfonatable group is an aliphatic group, sulfonation reaction may result in substitution of a hydrogen on an aliphatic group with a sulfonic acid or halosulfonic group. One example of direct sulfonation of a sulfonatable pre-polymer having a sulfonatable biphenyl group and a phenyl bromide reactive end group is illustrated in the reaction scheme of FIG. 12. Another example of direction sulfonation of a block copolymer having a sulfonatable polymer segment comprising a sulfonatable biphenyl group is illustrated in the reaction scheme of FIG. 13. The following examples illustrate the various embodiments of the present invention. Those skilled in the art will recognize many variations that are within the spirit of the present invention and scope of the claims.

EXAMPLE 1A

Difluorophenylsulfone Endcapped Segment

Biphenyl trifluorovinyl ether (BPVE) monomer (10.00 g, 28.90 mmol), 4-fluorophenylsulfone-phenyl trifluorovinylether (0.74 g, 2.22 mmol) and diphenyl ether (50 g) (DPE) are mixed together and degassed with Ar for about 1 hour at 75° C. The reaction mixture is then heated at 180° C. overnight, or until the molecular weight ceases to increase. The reaction is carried out in a 1 L stainless steel reactor with mechanical stirring (stainless steel stirrer rod and a Teflon blade) and condenser. The pre-polymer is diluted with 60 ml of tetrahydrofuran (THF), precipitates over 500 ml of methanol and is collected on Teflon filter paper.

EXAMPLE 1B

Bisphenol Endcapped Perfluorocyclobutane Segment

6F monomer (10.00 g, 19.92 mmol), 4-hydroxy phenyl trifluorovinylether (0.83 g, 3.90 mmol) and diphenyl ether (50 g) (DPE) are mixed together and degassed with Ar for about 1 hour at 75° C. The reaction mixture is then heated at 180° C. overnight, or until the molecular weight ceases to increase. The reaction is carried out in a 1 L stainless steel reactor with mechanical stirring (stainless steel stirrer rod and a Teflon blade) and condenser. The pre-polymer is diluted with 60 ml of tetrahydrofuran (THF), precipitates to 500 ml of methanol and collected on teflon filter paper.

EXAMPLE 1C

Polymerization via the Carbonate Process

Difluorophenylsulfone endcapped segment (10.00 g); bisphenol endcapped segment (5.00 g), diphenylether (75 g) and toluene (10 g) are charged in a 3-necked round bottom glass flask equipped with a stirrer, argon inlet and Dean Stark trap with a condenser. Potassium carbonate (3.0 g) is added and the reaction mixture is heated until toluene begins to reflux and the temperature is maintained for 1 hour. The reaction temperature is increased to 165° C. and is maintained until polymerization growth ceases, as monitored by gel permeation chromatography. At the end of the reaction, the viscous solution is cooled to 60° C. and diluted in THF (50 g) at 60° C. with increased stirring speed. The polymer solution is filtered through an ETFE filter cloth and precipitates by slowly pouring into methanol (1 L) while agitating with a magnetic stirrer. The polymer is collected on filter paper and a Soxhlet extraction is performed with methanol to remove traces of DPE from the copolymer

EXAMPLE 1D

Sulfonation and Membrane Preparation

One gram of poly(biphenyl-perfluorovinyl ether), 1c obtained from Tetramer Technology (Pendleton, S.C., and prepared as described above), dissolved in methylene chloride (Aldrich, catalog number 61005-0040, 10 mL) is centrifuged for 15 minutes. The clear supernatant solution is decanted off from the sediment, which is a white insoluble gel. The resultant solution (9.7 g) is magnetically stirred in a 30-mL, glass, screw cap jar with a Teflon face lined lid. Chlorosulfonic acid (Aldrich, 2.5 g) is added and the reaction mixture immediately turns purple and a polymeric residue forms. After 60 minutes, the methylene chloride solvent is decanted off from the purple polymer that precipitates out of the reaction mixture. The purple precipitate is washed with water using a Waring blender until a white polymer is obtained and boiled for 1 hour in deionized water. The polymer is collected by filtration and air-dried. The polymer (0.8 g) in N,N-dimethylacetamide (6 g) is pressure filtered through a 0.5-micron Teflon Millipore filter and the yellow solution is coated on window-pane glass using an Erichsen coater set at 80° C. with an 8-mil gap Bird bar applicator. The film is successfully evaluated in a hydrogen-air fuel cell membrane using 0.4 mg/cm$^2$-platinum on carbon (Tanaka) catalyst electrodes coated on carbon fiber diffusion media with a sintered-Teflon particle, microporous layer.

EXAMPLE 2A

Fluorophenylbenzophenone Endcapped Segment biphenyl trifluorovinyl ether (BPVE) monomer (10.00 g, 28.90 mmol), 4-fluorophenyl-4'-trifluorovinylether benzophenone # (0.66 g, 2.22 mmol) and diphenyl ether (50 g) (DPE) are mixed together and degassed with Ar for about 1 hour@75° C. The reaction mixture is then heated at 180° C. overnight, or until the molecular weight ceases to increase. The reaction is carried out in a 1 L stainless steel reactor with mechanical stirring using a stainless steel stirrer rod and a Teflon blade and condenser. The pre-polymer is diluted with 60 ml of tetrahydrofuran (THF), precipitates to 500 ml of methanol and is collected on Teflon filter paper.

EXAMPLE 2B

Polymerization via the Carbonate Process

Fluorophenylbenzophenone endcapped segment (10.00 g); bisphenol endcapped segment # (5.00 g), diphenylether (75 g) and toluene (10 g) are charged in a 3-necked round bottom glass flask equipped with a stirrer, argon inlet and Dean Stark trap with a condenser. Potassium carbonate (3.0 g) is added and the reaction mixture is heated until toluene began to reflux and the temperature is maintained for 1 hour. The reaction temperature is increased to 165° C. and maintained until polymerization growth ceases, as monitored by gel permeation chromatography. At the end of the reaction, the viscous solution is cooled to 60° C. and diluted in THF (75 g) at 60° C. with increased stirring speed. The polymer solution is filtered through an Teflon filter cloth and is precipitated by slowly pouring into methanol (1 L) while agitating with a magnetic stirrer. The polymer is collected on filter paper and a Soxhlet extraction is performed with methanol to remove traces of DPE from the copolymer

EXAMPLE 3A

Polymerization via FAVE Chemistry

To a 250 mL one-neck round bottom flask equipped with magnetic stir is added 70 mL DMF, 12 gram BPVE oligomer (Mn 8,000, Tetramer), 7 gram of hydroxyl terminated 6F block (Mn=5,000, Tetramer). Then 0.7 gram of $Cs_2CO_3$ (from Sigma-Aldrich, 99.9% purity) is added into the reaction mixture. The reaction mixture is heated to 90° C. (oil bath temperature) and kept for 24 hours under inert nitrogen gas flow. After reaction is done, the solution is precipitated into 1500 mL methanol, filtered under mild vacuum and washed repeatedly with methanol again in order to remove the DMF residue. Finally, the solid polymer is dried in a vacuum oven at 90° C. overnight to afford the BPVE-6F block copolymer 18 g (Mn=50,000, 92% yield).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A polymer comprising polymer segments 1 and 2:

$E_1(SO_2X)_d\text{-}P_1\text{-}Q_1P_2$     [1]

$E_2\text{-}P_3\text{-}Q_2\text{-}P_4$     [2]

connected by a linking group $L_1$ to form polymer unit 3 and polymer unit 4:

     [3]

     [4]

wherein:
$Z_1$ is $-SO_2X$, $-PO_3H_2$ or $-COX$;
$E_1$ is an aromatic-containing moiety;
$E_2$ is an unsulfonated aromatic-containing and/or aliphatic-containing moiety;
$L_1$ is a linking group;
X is an $-OH$, a halogen, an ester, or

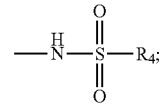

d is a number of $Z_1$ functional groups attached to $E_1$;
$P_1$, $P_2$, $P_3$, $P_4$ are each independently absent, $-O-$, $-S-$, $-SO-$, $-SO_2-$, $-CO-$, $-NH-$, $NR_2-$, $-R_3-$, and
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group;
$Q_1$, $Q_2$ are each independently a fluorinated cyclobutyl moiety;
i is a number representing repetition of polymer segment 1; and,
j is a number representing repetition of a polymer segment 2.

2. The polymer of claim 1 wherein $Q_1$ and $Q_2$ are each independently a perfluorocyclobutyl moiety.

3. The polymer of claim 1 wherein $Q_1$ and $Q_2$ are each independently:

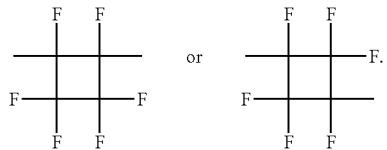

4. The polymer of claim 1 wherein polymer unit 3 is repeated to form the following polymer unit:

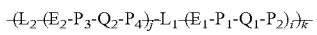

where $L_2$ is absent or a linking group and k is an integer representing repetition of the polymer unit 3.

5. The polymer of claim 4 wherein $L_1$ and $L_2$ each independently comprise an ether, imide, amide, ester, amine, ketone or acyl groups.

6. The polymer of claim 4 wherein $L_1$ and $L_2$ each independently comprise a chemical structure represented by one of the following formulae:

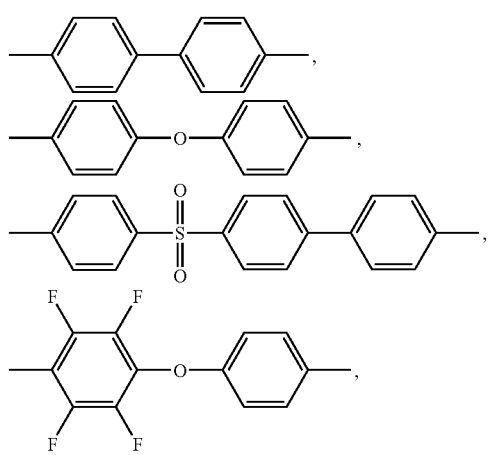

-continued
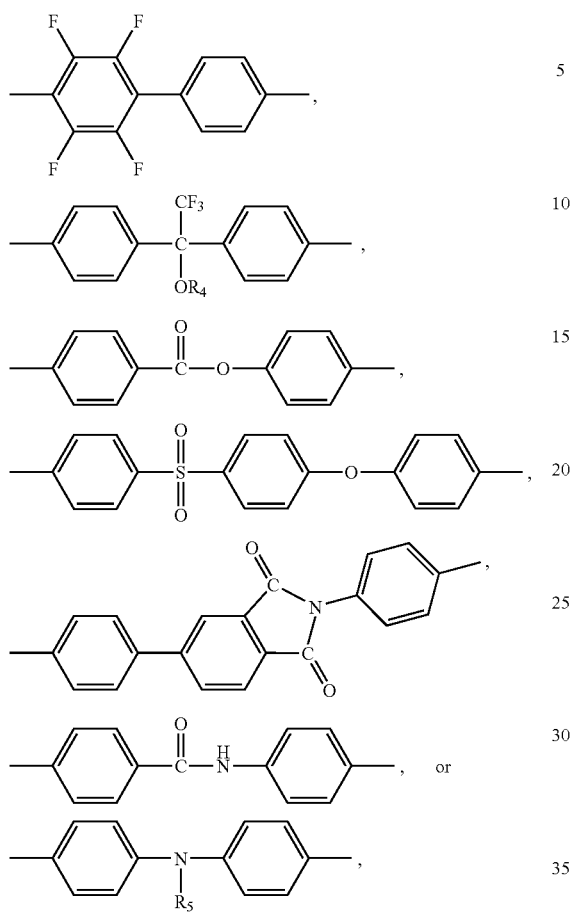
7. The polymer of claim 1 wherein $E_1$ and $E_2$ each independently comprises a structural unit represented by one of the following formulas:
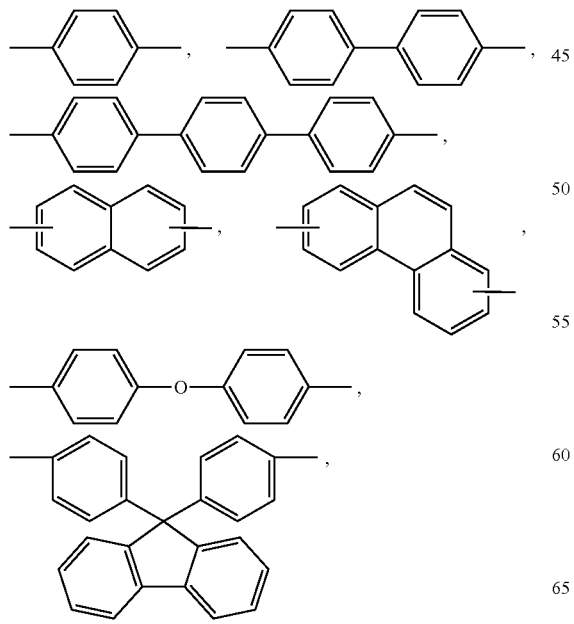
-continued
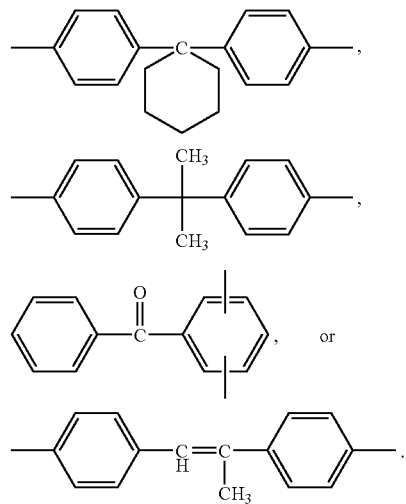
8. The polymer of claim 1 wherein $E_2$ comprises a structural unit represented by one of the following formulas:
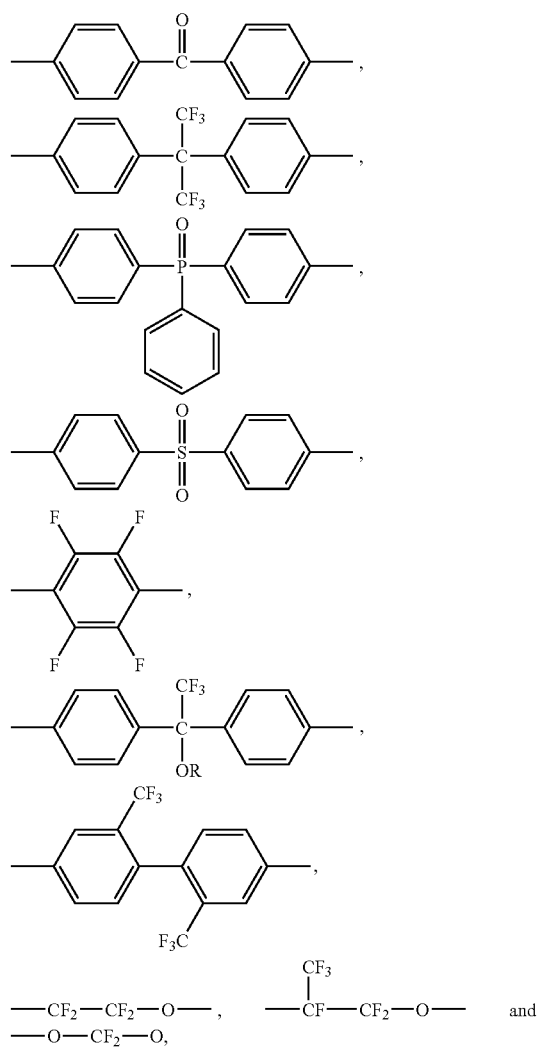
$$—CF_2—CF_2—O—, \quad —CF—CF_2—O— \quad \text{and}$$
$$—O—CF_2—O,$$
O—$CF_7$—O, where R is an acyl group.

9. The polymer of claim 1 having the following formula:
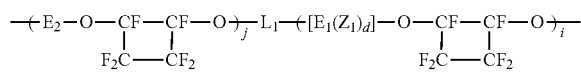
10. The polymer of claim 1 wherein the $Z_i$ group is present at about 1 meq/g or greater.
11. The polymer of claim 1 wherein $E_1$ comprises at least one phenyl or phenylene group to which $Z_1$ is directly attached.
12. The polymer of claim 1 wherein $E_1(Z_1)_d$ comprises a structure unit represented by one of the following formulae:
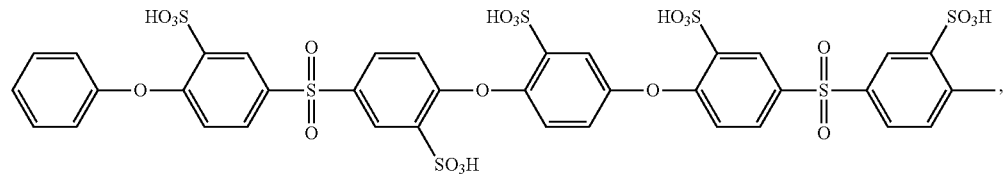
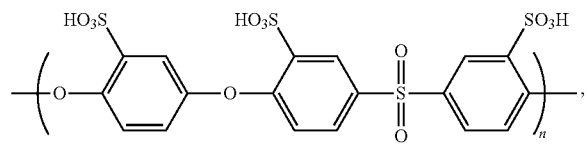
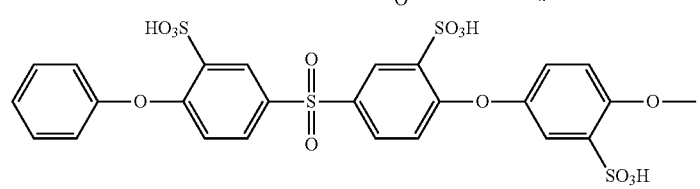
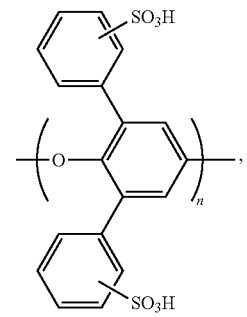
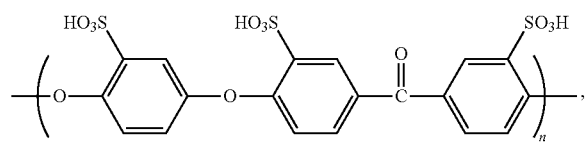
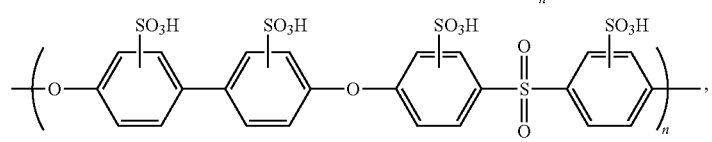
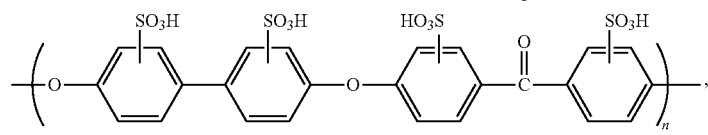
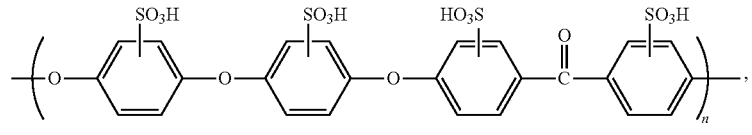
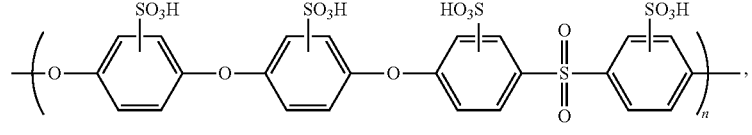
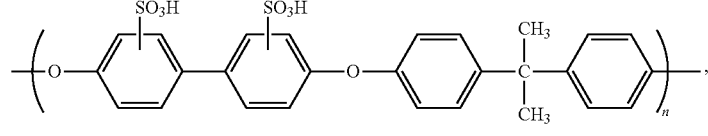

-continued
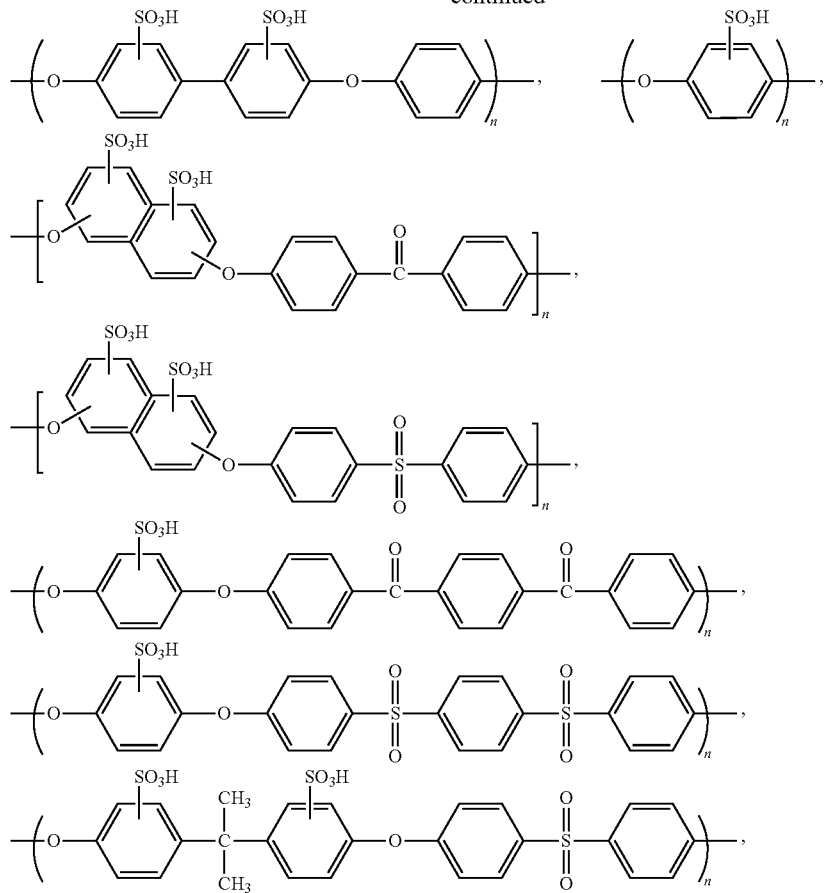
where n is a positive integer.